(12) United States Patent
Anzai et al.

(10) Patent No.: US 11,947,109 B2
(45) Date of Patent: Apr. 2, 2024

(54) PROJECTION IMAGE-DISPLAYING MEMBER, WINDSHIELD GLASS, AND HEAD-UP DISPLAY SYSTEM

(71) Applicant: FUJIFILM Corporation, Tokyo (JP)

(72) Inventors: Akihiro Anzai, Minami-ashigara (JP); Yujiro Yanai, Minami-ashigara (JP); Wataru Majima, Minami-ashigara (JP); Taketo Otani, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 498 days.

(21) Appl. No.: 17/343,160

(22) Filed: Jun. 9, 2021

(65) Prior Publication Data

US 2021/0294099 A1 Sep. 23, 2021

Related U.S. Application Data

(63) Continuation of application No. PCT/JP2019/048114, filed on Dec. 9, 2019.

(30) Foreign Application Priority Data

Dec. 10, 2018 (JP) .................. 2018-231008

(51) Int. Cl.
*G02B 27/01* (2006.01)
*B60K 35/00* (2006.01)
*G02B 27/28* (2006.01)

(52) U.S. Cl.
CPC .......... *G02B 27/0101* (2013.01); *B60K 35/00* (2013.01); *G02B 27/286* (2013.01); *B60K 2370/1529* (2019.05); *B60K 2370/39* (2019.05)

(58) Field of Classification Search
None
See application file for complete search history.

(56) References Cited

U.S. PATENT DOCUMENTS

2004/0136066 A1 7/2004 Kashima
2007/0132914 A1 6/2007 Takahashi et al.
(Continued)

FOREIGN PATENT DOCUMENTS

JP 2005-148713 A 6/2005
JP 2017-187685 A 10/2017
(Continued)

OTHER PUBLICATIONS

Office Action issued in corresponding Japanese Patent Application No. 2020-560099 dated Jan. 4, 2023 with English translation.
(Continued)

*Primary Examiner* — Bao-Luan Q Le
*Assistant Examiner* — Danell L Owens
(74) *Attorney, Agent, or Firm* — Birch, Stewart, Kolasch & Birch, LLP

(57) ABSTRACT

It is an object of the present invention to provide a projection image-displaying member having excellent suitability for polarizing sunglasses, a windshield glass, and a head-up display system. The projection image-displaying member has a first polarization converting layer, at least one selectively reflecting layer, and a second polarization converting layer in this order. The first polarization converting layer and the second polarization converting layer are layers formed by fixing a helical alignment structure of a liquid crystal compound. The number of pitches in the helical alignment structure and a film thickness satisfy all relational expressions below.
When the first polarization converting layer has a number of pitches $x_1$ and a film thickness $y_1$ (unit: μm), $0.3 \leq x_1 \leq 2.0$ and (i)

$y_1 \geq 1.86x_1 + 0.13$. (ii)

(Continued)

When the second polarization converting layer has a number of pitches $x_2$ and a film thickness $y_2$ (unit: μm), $0.25 \leq x_2 \leq 2.0$, (iii)

$y_2 \leq 1.37x_2 + 5.5$, and (iv)

$y_2 \geq 1.37x_2 + 0.25$. (v)

9 Claims, 4 Drawing Sheets

(56) References Cited

U.S. PATENT DOCUMENTS

| | | |
|---|---|---|
| 2017/0235030 A1 | 8/2017 | Tanaka et al. |
| 2017/0343806 A1 | 11/2017 | Anzai et al. |
| 2017/0343807 A1 | 11/2017 | Anzai et al. |
| 2019/0030856 A1 | 1/2019 | Hayasaki et al. |
| 2019/0235243 A1* | 8/2019 | Anzai ............... G02B 5/3025 |

FOREIGN PATENT DOCUMENTS

| | | |
|---|---|---|
| JP | 2018-081296 A | 5/2018 |
| WO | WO 95/20180 | 7/1995 |
| WO | WO 2016/056617 A1 | 4/2016 |
| WO | WO 2016/133186 A1 | 8/2016 |
| WO | WO 2016/133187 A1 | 8/2016 |
| WO | WO 2017/175852 A1 | 10/2017 |
| WO | WO 2018/110066 A1 | 6/2018 |

OTHER PUBLICATIONS

Japanese Notice of Reasons for Refusal for corresponding Japanese Application No. 2020-560099, dated Aug. 2, 2022, with an English translation.

Extended European Search Report for corresponding European Application No. 19894588.3, dated Jan. 24, 2022.

International Preliminary Report on Patentability (Form PCT/IPEA/409) for International Application No. PCT/JP2019/048114, dated Feb. 5, 2021, with English translation.

International Search Report (Form PCT/ISA/210) for International Application No. PCT/JP2019/048114, dated Mar. 3, 2020, with English translation.

Written Opinion of International Searching Authority (Form PCT/ISA/237) for International Application No. PCT/JP2019/048114, dated Mar. 3, 2020.

* cited by examiner

PROJECTION IMAGE-DISPLAYING MEMBER, WINDSHIELD GLASS, AND HEAD-UP DISPLAY SYSTEM

CROSS-REFERENCE TO RELATED APPLICATIONS

This application is a Continuation of PCT International Application No. PCT/JP2019/048114 filed on Dec. 9, 2019, which claims priority under 35 U.S.C. § 119(a) to Japanese Patent Application No. 2018-231008 filed on Dec. 10, 2018. Each of the above applications is hereby expressly incorporated by reference, in its entirety, into the present application.

BACKGROUND OF THE INVENTION

1. Field of the Invention

The present invention relates to a projection image-displaying member that can be used as a combiner for head-up display systems, and a windshield glass and a head-up display system having the projection image-displaying member. The present invention particularly relates to a projection image-displaying member having a selectively reflecting layer that wavelength-selectively reflects light, and a windshield glass and a head-up display system having the projection image-displaying member.

2. Description of the Related Art

At present, head-up displays or head-up display systems are known that project a screen image on a windshield of a vehicle or the like and provide various information such as a map, a driving speed, and a vehicle state to a driver or the like.

In such a head-up display system, a driver or the like observes a virtual image of a screen image projected on the windshield and including the above-mentioned various information. The imaging position of the virtual image is located ahead of the windshield outside a car, and is normally located 1000 mm or more ahead of the windshield and on the outer side of the windshield. Thus, a driver can obtain the above-mentioned various information without widely moving the line of sight while seeing the outside front view. Therefore, when the head-up display system is used, it is expected that driving is more safely performed while various information is obtained.

The windshield glass can constitute a head-up display system by forming a projection image-displaying section using a half-mirror film. Various films that can be used as the half-mirror film have been proposed.

WO2016/056617A discloses a light reflection film which includes one or more light reflection layers among a light reflection layer PRL-1 having a reflection center wavelength of 400 nm or more and less than 500 nm and having a reflectivity of 5% or more and 25% or less for normal light at the reflection center wavelength, a light reflection layer PRL-2 having a reflection center wavelength of 500 nm or more and less than 600 nm and having a reflectivity of 5% or more and 25% or less for normal light at the reflection center wavelength, and a light reflection layer PRL-3 having a reflection center wavelength of 600 nm or more and less than 700 nm and having a reflectivity of 5% or more and 25% or less for normal light at the reflection center wavelength and in which at least two light reflection layers having different reflection center wavelengths are laminated, and the at least two light reflection layers laminated each reflect polarized light having the same direction.

JP2017-187685A discloses a curved-surface light reflection film which includes one or more light reflection layers among a flat light reflection layer PRL-1 having a reflection center wavelength of 400 nm or more and less than 500 nm and having a reflectivity of 5% or more and 25% or less for normal light at the reflection center wavelength, a flat light reflection layer PRL-2 having a reflection center wavelength of 500 nm or more and less than 600 nm and having a reflectivity of 5% or more and 25% or less for normal light at the reflection center wavelength, and a flat light reflection layer PRL-3 having a reflection center wavelength of 600 nm or more and less than 700 nm and having a reflectivity of 5% or more and 25% or less for normal light at the reflection center wavelength and in which at least two light reflection layers having different reflection center wavelengths are laminated, and the at least two light reflection layers laminated each have a characteristic of reflecting polarized light in the same direction, each have a curved surface held without a load, and have a thickness of 50 μm or more and 500 μm or less.

WO2016/056617A and JP2017-187685A in which the light reflection layer has high reflectivity for light that is converted into particular polarized light and emitted from screen image display means can be used for head-up displays.

SUMMARY OF THE INVENTION

Although the light reflection films in WO2016/056617A and JP2017-187685A are used for head-up displays, head-up displays are required to have high visible light transmittance and allow a driver to visually recognize a screen image even when the driver wears polarizing sunglasses.

Since such polarizing sunglasses have a function of screening out s-polarized light, glare caused by light that is reflected from the hood of cars in the opposite lane or puddles and that interferes with driving is made invisible. In the configuration described in the above patent documents, a screen image can be visually recognized because the member displays a projection image using p-polarized light and reflects the p-polarized light. However, the polarization of light that passes through a reflection film in a windshield changes, which impairs the function of screening out the above-described glare caused by reflected light whose main component is s-polarized light. In particular, the screening function is impaired more for obliquely incident s-polarized light, which interferes with driving.

It is an object of the present invention to provide a projection image-displaying member having excellent suitability for polarizing sunglasses on incident light of reflected natural light, a windshield glass, and a head-up display system.

[1] A projection image-displaying member has a first polarization converting layer, at least one selectively reflecting layer, and a second polarization converting layer in this order. The first polarization converting layer and the second polarization converting layer are layers formed by fixing a helical alignment structure of a liquid crystal compound. The number of pitches in the helical alignment structure and a film thickness satisfy all relational expressions below.

When the first polarization converting layer has a number of pitches $x_1$ and a film thickness $y_1$ (unit: μm), $$0.3 \leq x_1 \leq 2.0 \text{ and} \tag{i}$$

$$y_1 \geq 1.86 x_1 + 0.13. \tag{ii}$$

When the second polarization converting layer has a number of pitches $x_2$ and a film thickness $y_2$ (unit: μm), $$0.25 \leq x_2 \leq 2.0, \quad \text{(iii)}$$

$$y_2 \leq 1.37x_2 + 5.5, \text{ and} \quad \text{(iv)}$$

$$y_2 \geq 1.37x_2 + 0.25. \quad \text{(v)}$$

[2] In the projection image-displaying member according to [1], the selectively reflecting layer is a linearly polarized light reflection layer.
[3] In the projection image-displaying member according to [1], the selectively reflecting layer is a circularly polarized light reflection layer.
[4] A windshield glass has the projection image-displaying member according to any one of [1] to [3] between a first glass plate and a second glass plate.
[5] A head-up display system has the windshield glass according to [4] and a projector that emits p-polarized projection image light from a side of the first polarization converting layer of the windshield glass.

The present invention provides a windshield glass having the projection image-displaying member.

The projection image-displaying member is preferably disposed between a first glass plate and a second glass plate.

An intermediate film is preferably disposed between a first glass plate and the projection image-displaying member and/or between the projection image-displaying member and a second glass plate.

The present invention provides a head-up display system having the projection image-displaying member, wherein the head-up display system has a windshield glass including the projection image-displaying member disposed between a first glass plate and a second glass plate and a projector that irradiates the windshield glass with p-polarized projected light.

The windshield glass preferably includes an intermediate film disposed between the first glass plate and the projection image-displaying member and/or between the projection image-displaying member and the second glass plate.

According to the present invention, there can be provided a projection image-displaying member having excellent suitability for polarizing sunglasses, a windshield glass, and a head-up display system.

DESCRIPTION OF THE PREFERRED EMBODIMENTS

Figure 1:
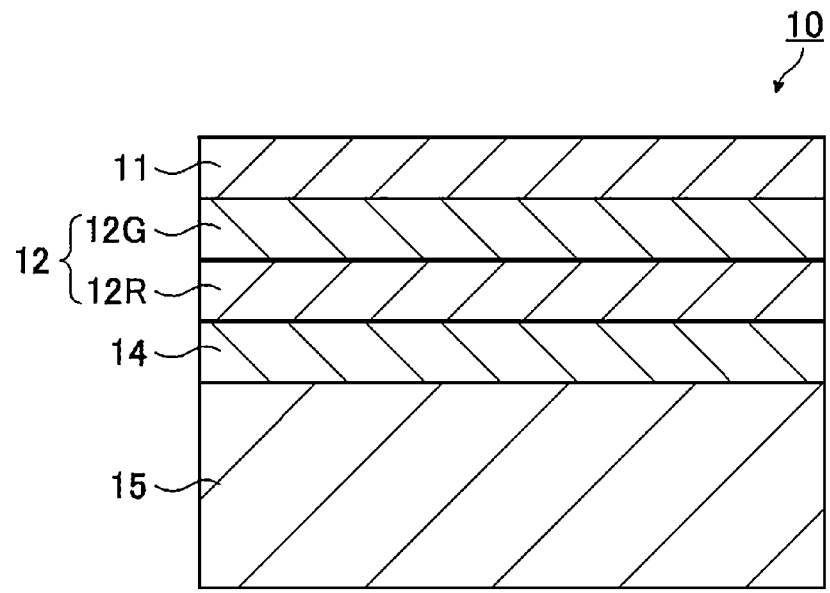
FIG. 1 is a schematic view illustrating an example of a projection image-displaying member according to an embodiment of the present invention.

Hereafter, a projection image-displaying member, a windshield glass, and a head-up display system according to embodiments of the present invention will be described in detail based on preferred embodiments illustrated in the attached drawings.

The drawings used for the following description are merely examples for describing the present invention, and the present invention is not limited to the drawings mentioned hereafter.

Hereafter, numerical values before and after "to" are inclusive in the numerical range. For example, when $\varepsilon_1$ is a value $\alpha_1$ to a value $\beta_1$, the range of $\varepsilon_1$ is a range including the value $\alpha_1$ and the value $\beta_1$, which is expressed by mathematical symbols as $\alpha_1 \leq \varepsilon_1 \leq \beta_1$.

The angles such as "angles expressed by specific values", "parallel", "vertical", and "orthogonal" include a margin of error generally tolerable in the corresponding technical field unless otherwise specified.

The "same" includes a margin of error generally tolerable in the corresponding technical field and, for example, the "entire surface" also includes a margin of error generally tolerable in the corresponding technical field.

The term "selective" in circular polarization means that the amount of one of a right circularly polarized component and a left circularly polarized component of light is larger than the amount of the other. Specifically, when the term "selective" is used, the degree of circular polarization of light is preferably 0.3 or more, more preferably 0.6 or more, and further preferably 0.8 or more. More preferably, the degree of circular polarization of light is substantially 1.0. Herein, the degree of circular polarization is expressed by $|I_R - I_L|/(I_R + I_L)$, where $I_R$ represents an intensity of a right circularly polarized component of light and $I_L$ represents an intensity of a left circularly polarized component of light.

The term "sense" in circular polarization means that the circular polarization is right circular polarization or left circular polarization. The sense of circular polarization is defined as follows. In the case where light is viewed such that it travels toward the viewer, when the end point of an electric field vector circulates clockwise with increasing time, the circular polarization is right circular polarization. When the end point circulates counterclockwise, the circular polarization is left circular polarization.

The term "sense" may be used for the twisted direction of the helix of a cholesteric liquid crystal. When the twisted direction (sense) of the helix of a cholesteric liquid crystal is right, right circularly polarized light is reflected and left circularly polarized light is transmitted. When the sense is left, left circularly polarized light is reflected and right circularly polarized light is transmitted.

The term "light" refers to light satisfying both visible light and natural light (unpolarized light) unless otherwise specified. Among electromagnetic waves, visible light is light that has wavelengths visible to the human eye and normally has wavelengths of 380 to 780 nm. Non-visible light refers to light having a wavelength range of less than 380 nm or a wavelength range of more than 780 nm.

Visible light having a wavelength range of 420 to 490 nm is blue (B) light, visible light having a wavelength range of 495 to 570 nm is green (G) light, and visible light having a wavelength range of 620 to 750 nm is red (R) light, though not limited thereto.

The term "visible light transmittance" refers to a transmittance of visible light from an A light source, which is defined in JIS (Japanese Industrial Standards) R 3212:2015 (Test methods of safety glazing materials for road vehicles). That is, the visible light transmittance is a transmittance determined by measuring the transmittance at each wavelength of 380 to 780 nm with a spectrophotometer using an A light source and multiplying the transmittance at each wavelength by the weighting function obtained from the wavelength distribution and wavelength interval of the CIE (International Commission on Illumination) photopic luminous efficiency function to calculate a weighted average.

The "reflected light" or "transmitted light" simply mentioned includes scattered light and diffracted light.

The polarization state of light at each wavelength can be measured with a spectroradiometer or spectrometer equipped with a circularly polarizing plate. In this case, the light intensity measured through a right circularly polarizing plate corresponds to $I_R$ and the light intensity measured through a left circularly polarizing plate corresponds to $I_L$. The measurement can also be performed while a circularly polarizing plate is attached to an illuminometer or a spectrophotometer. A right circularly polarizing plate is attached and the right circular polarization amount is measured. A left circularly polarizing plate is attached and the left circular polarization amount is measured. Thus, the ratio can be measured.

The p-polarized light refers to polarized light that oscillates in a direction parallel to the incidence plane of light. The incidence plane is a plane that is vertical to the reflection plane (e.g., windshield glass surface) and that includes incident light and reflected light. In the p-polarized light, the oscillation plane of an electric field vector is parallel to the incidence plane.

The front retardation is measured using an AxoScan manufactured by Axometrics. The measurement wavelength is set to 550 nm unless otherwise specified. The front retardation may also be measured using a KOBRA 21ADH or a KOBRA WR (manufactured by Oji Scientific Instruments) by casting light having a wavelength in the visible wavelength range in the direction normal to the film. For the selection of the measurement wavelength, a wavelength selective filter can be manually changed or the measured value can be converted, for example, by using a program.

The term "projection image" refers to an image based on the projection of light from a projector used, but not a surrounding view such as a front view. The projection image is observed as a virtual image that emerges in an area ahead of a projection image-displaying section of a windshield glass when viewed from a viewer.

The term "screen image" refers to an image displayed on a drawing device of a projector or an image drawn on, for example, an intermediate image screen by the drawing device. As opposed to the virtual image, the screen image is a real image.

Each of the screen image and the projection image may be a monochrome image, a multicolored image with two or more colors, or a full-color image.

Projection Image-Displaying Member

The projection image-displaying member refers to a half mirror capable of reflecting projected light on which a screen image is carried and displaying, as a projection image, the screen image carried on the projected light using the reflected light of the projected light.

The projection image-displaying member has a visible light-transmitting property. Specifically, the visible light transmittance of the projection image-displaying member is preferably 80% or more, more preferably 82% or more, and further preferably 84% or more. Even if the projection image-displaying member is combined with a glass having a low visible light transmittance to form a laminated glass, a visible light transmittance that meets the standards of a windshield glass for vehicles can be achieved when the projection image-displaying member has such a high visible light transmittance.

The projection image-displaying member preferably does not exhibit substantial reflection in a wavelength range with high luminosity. Specifically, a typical laminated glass and a laminated glass incorporating the projection image-displaying member preferably exhibit substantially the same reflection of light in the normal direction at a wavelength of near 550 nm. They more preferably exhibit substantially the same reflection in a visible light wavelength range of 490 to 620 nm. The term "substantially the same reflection" means that, for example, the difference in reflectivity of natural light (unpolarized light) measured in the normal direction at the target wavelength using a spectrophotometer such as a spectrophotometer "V-670" manufactured by JASCO Corporation is 10% or less. In the above wavelength range, the difference in reflectivity is preferably 5% or less, more preferably 3% or less, further preferably 2% or less, and particularly preferably 1% or less. Even if the projection image-displaying member is combined with a glass having a low visible light transmittance to form a laminated glass, a visible light transmittance that meets the standards of a windshield glass for vehicles can be achieved when substantially the same reflection is exhibited in a wavelength range with high luminosity.

The projection image-displaying member may be, for example, a thin film-shaped member or a sheet-shaped member. The projection image-displaying member may be, for example, a rolled thin film before used for a windshield glass.

It is sufficient that the projection image-displaying member has a function as a half mirror for at least part of projected light. For example, the projection image-displaying member does not necessarily function as a half mirror for light in the entire visible light range. The projection image-displaying member may have the above-described function as a half mirror for light with all incidence angles, but it is sufficient that the projection image-displaying member has the above-described function for light with at least some of incidence angles.

The projection image-displaying member has a first polarization converting layer, a selectively reflecting layer, and a second polarization converting layer. The projection image-displaying member may include, for example, a retardation layer, a support, an alignment layer, and an adhesive layer as long as the first polarization converting layer, the selectively reflecting layer, and the second polarization converting layer are included. Hereafter, the projection image-displaying member will be more specifically described.

FIG. 1 is a schematic view illustrating an example of a projection image-displaying member according to an embodiment of the present invention. As illustrated in FIG. 1, for example, a projection image-displaying member 10 has a laminate structure in which a first polarization converting layer 14, a selectively reflecting layer 12, and a second polarization converting layer 11 are formed on a support 15 in this order. The projection image-displaying member 10 does not necessarily include the support 15 as long as at least the first polarization converting layer 14, the selectively reflecting layer 12, and the second polarization converting layer 11 are included.

Selectively Reflecting Layer

The selectively reflecting layer is a layer that wavelength-selectively reflects light as described above. The selectively reflecting layer preferably exhibits selective reflection in part of the visible light wavelength range. It is sufficient that the selectively reflecting layer reflects light for displaying a projection image.

The selectively reflecting layer may have selectively reflecting layers corresponding to different wavelength ranges. For example, the selectively reflecting layer 12 illustrated in FIG. 1 has a first selectively reflecting layer 12G that wavelength-selectively reflects light having a wavelength of 500 to 650 nm and a second selectively reflecting layer 12R that wavelength-selectively reflects light having a wavelength of 650 to 900 nm. The first polarization converting layer 12G and the second selectively reflecting layer 12R are formed on the first polarization converting layer 14 in this order.

The selectively reflecting layer is preferably a polarized light reflection layer. The polarized light reflection layer is a layer that reflects linearly polarized light, circularly polarized light, or elliptically polarized light. The polarized light reflection layer is preferably a circularly polarized light reflection layer or a linearly polarized light reflection layer. The circularly polarized light reflection layer is a layer that reflects circularly polarized light having one sense and transmits circularly polarized light having the other sense at the center wavelength of selective reflection. The linearly polarized light reflection layer is a layer that reflects linearly polarized light in one polarization direction and transmits linearly polarized light in a polarization direction orthogonal to the above polarization direction at the center wavelength of selective reflection. The polarized light reflection layer can transmit polarized light not subjected to reflection and can also partly transmit light in the wavelength range in which the selectively reflecting layer exhibits reflection. Therefore, the polarized light reflection layer is preferred because the deterioration of tint of light that has passed through the projection image-displaying member is suppressed and a decrease in visible light transmittance is also suppressed.

The selectively reflecting layer preferably includes a cholesteric liquid crystal layer and may include two or more cholesteric liquid crystal layers.

The center wavelength of the selectively reflecting layer is preferably 500 to 650 nm and 650 to 900 nm, more preferably 530 to 630 nm and 670 to 850 nm, and further preferably 550 to 610 nm and 680 to 800 nm from the viewpoint of tint and visible light transmittance.

When the selectively reflecting layer includes a cholesteric liquid crystal layer, the projection image-displaying member preferably includes a retardation layer. By combining the retardation layer with the cholesteric liquid crystal layer, a clear projection image can be displayed. The adjustment of the front retardation and the direction of a slow axis can achieve high brightness in the head-up display system and can also provide a projection image-displaying member capable of suppressing formation of double images.

Herein, when light obliquely enters the cholesteric liquid crystal layer, the reflection center wavelength is known to shift to shorter wavelengths. The shift of the reflection center wavelength to shorter wavelengths is referred to as blue shift. For oblique light, blue shift occurs in the cholesteric liquid crystal layer because the difference in optical path length between layers decreases through optical interference. Therefore, when observation is performed in an oblique direction, blue shift occurs. Thus, when the selectively reflecting layer includes a cholesteric liquid crystal layer, the reflection center wavelength at the front of the selectively reflecting layer is desirably shifted to longer wavelengths to compensate the amount of shift of the reflection center wavelength to shorter wavelengths in advance. The center wavelength of oblique light is expressed by "center wavelength at front×cos θ", where θ represents an angle relative to the front obtained when the oblique light propagates through the selectively reflecting layer. In consideration of this, the reflection center wavelength can be shifted. The wavelength range of the above-described selectively reflecting layer 12 is set in consideration of blue shift.

Cholesteric Liquid Crystal Layer

The cholesteric liquid crystal layer refers to a layer in which a cholesteric liquid crystal phase is fixed.

The cholesteric liquid crystal layer may be any layer as long as the alignment of the liquid crystal compound serving as a cholesteric liquid crystal phase is maintained. Typically, the polymerizable liquid crystal compound may be brought into the alignment state of a cholesteric liquid crystal phase and polymerized and cured by, for example, ultraviolet irradiation or heating to form a layer which has no fluidity and also whose alignment state is not changed by an external field or an external force. In the cholesteric liquid crystal layer, the liquid crystal compound in the layer does not necessarily exhibit liquid crystallinity as long as the optical properties of the cholesteric liquid crystal phase are maintained in the layer. For example, the polymerizable liquid crystal compound may lose its liquid crystallinity as a result of an increase in the molecular weight due to curing reaction.

The cholesteric liquid crystal phase is known to exhibit circularly polarized light selective reflection, that is, to selectively reflect circularly polarized light having one sense, either right circularly polarized light or left circularly polarized light, and selectively transmit circularly polarized light having the other sense.

Many films formed of compositions including polymerizable liquid crystal compounds have been known as films that exhibit circularly polarized light selective reflection and include layers in which the cholesteric liquid crystal phase is fixed. The cholesteric liquid crystal layer can be found in the related art.

The selective reflection center wavelength λ of the cholesteric liquid crystal layer is dependent on the pitch P (=helical period) of the helical structure in a cholesteric phase and satisfies the formula $\lambda = n \times P$, where n represents an average refractive index of the cholesteric liquid crystal layer. As is clear from the above formula, the selective reflection center wavelength can be controlled by adjusting the n value and the P value.

The selective reflection center wavelength and the half-width of the cholesteric liquid crystal layer can be determined as follows.

When the reflection spectrum (the spectrum measured in a direction normal to the cholesteric liquid crystal layer) of the cholesteric liquid crystal layer is measured using a spectrophotometer (manufactured by JASCO Corporation, V-670), a peak having a decreased transmittance is observed in the selective reflection region. Of two wavelengths at the minimum transmittance of this peak and the intermediate (average) transmittance between the minimum transmittance and the transmittance of a peak whose transmittance is not decreased, when the shorter wavelength is defined as $\lambda_l$ (nm) and the longer wavelength is defined as $\lambda_h$ (nm), the selective reflection center wavelength $\lambda$ and the half-width $\Delta\lambda$ can be expressed by the following formula.

$$\lambda=(\lambda_l+\lambda_h)/2$$

$$\Delta\lambda=(\lambda_h-\lambda_l)$$

The selective reflection center wavelength determined as described above is substantially equal to the wavelength at the barycentric position of the reflection peak of the circularly polarized light reflection spectrum measured in a direction normal to the cholesteric liquid crystal layer.

In the head-up display system described later, the reflectivity at the surface of a glass plate on the projection light incidence side can be decreased by using the head-up display system such that light obliquely enters the windshield glass. At this time, the light also obliquely enters the cholesteric liquid crystal layer. For example, light that is incident at an angle of 45° to 70° relative to the normal line of the projection image-displaying section in the air having a refractive index of 1 passes through a cholesteric liquid crystal layer having a refractive index of about 1.61 at an angle of about 26° to 36°. In this case, the reflection wavelength shifts to shorter wavelengths. When light beams pass through a cholesteric liquid crystal layer in which the selective reflection center wavelength is $\lambda$ at an angle $\theta_2$ with respect to the direction normal to the cholesteric liquid crystal layer (the helical axis direction of the cholesteric liquid crystal layer), the selective reflection center wavelength $\lambda_d$ is expressed by formula below.

$$\lambda_d=\lambda\times\cos\theta_2$$

Therefore, the cholesteric liquid crystal layer having a selective reflection center wavelength in the range of 650 to 780 nm at an angle $\theta_2$ of 26° to 36° can reflect projection light in the range of 520 to 695 nm.

Such a wavelength range is a wavelength range with high luminosity and thus highly contributes to the brightness of the projection image, which can provide a projection image with high brightness.

The pitch of the cholesteric liquid crystal phase is dependent on the type of chiral agent used together with the polymerizable liquid crystal compound and the concentration of the chiral agent added. Therefore, a desired pitch can be achieved by controlling the type and the concentration. The sense and pitch of a helix can be measured by the methods described in p. 46 of "Ekisho Kagaku Jikken Nyumon (Introduction of Liquid Crystal Chemical Experiments)" edited by The Japanese Liquid Crystal Society, published by SIGMA SHUPPAN, 2007 and p. 196 of "Handbook of Liquid Crystals" edited by the Editorial Board of the Handbook of Liquid Crystals, published by Maruzen Co., Ltd.

In the projection image-displaying member, cholesteric liquid crystal layers are preferably disposed in the order of layers having a shorter selective reflection center wavelength when viewed from the viewer side (the inside of a car).

Each of the cholesteric liquid crystal layers is a cholesteric liquid crystal layer whose helical sense is right or left. The sense of circularly polarized light reflected at the cholesteric liquid crystal layer matches the helical sense. The cholesteric liquid crystal layers having different selective reflection center wavelengths may have the same helical sense or different helical senses. However, all of a plurality of cholesteric liquid crystal layers preferably have the same twist direction.

The projection image-displaying member preferably does not include cholesteric liquid crystal layers having different helical senses as cholesteric liquid crystal layers that exhibit selective reflection in the same or overlapping wavelength range. The reason for this is to avoid a decrease in transmittance to, for example, less than 50% in a particular wavelength range.

The half-width $\Delta\lambda$ (nm) of a selective reflection band in which selective reflection is exhibited is dependent on the birefringence $\Delta n$ of the liquid crystal compound and the above-described pitch P and satisfies $\Delta\lambda=\Delta n\times P$. Therefore, the width of the selective reflection band can be controlled by adjusting $\Delta n$. The adjustment of $\Delta n$ can be performed by adjusting the types or mixing ratio of polymerizable liquid crystal compounds or by controlling the temperature at which the alignment is fixed.

To form a single type of cholesteric liquid crystal layer having the same selective reflection center wavelength, a plurality of cholesteric liquid crystal layers having the same pitch P and the same helical sense may be laminated. By laminating cholesteric liquid crystal layers having the same pitch P and the same helical sense, the selectivity of circularly polarized light at a particular wavelength can be increased.

The selectively reflecting layer 12 preferably includes a cholesteric liquid crystal layer having a reflection wavelength range with a half-width of 150 nm or more within the wavelength range of 540 to 850 nm. When the selectively reflecting layer 12 has a half-width of 150 nm or more, the cholesteric liquid crystal layer having a selective reflection center wavelength serves as a wide-band selectively reflecting layer, which can increase the brightness of a screen image.

When a plurality of cholesteric liquid crystal layers are laminated, separately formed cholesteric liquid crystal layers may be laminated using an adhesive or the like or a liquid crystal composition including a polymerizable liquid crystal compound and the like may be directly applied onto a surface of a cholesteric liquid crystal layer previously formed by a method described below and alignment and fixing steps may be repeatedly performed. The latter method is preferred. By directly forming the next cholesteric liquid crystal layer on a surface of the previously formed cholesteric liquid crystal layer, the alignment direction of liquid crystal molecules of the previously formed cholesteric liquid crystal layer on the air interface side matches the alignment direction of liquid crystal molecules on the lower side of a cholesteric liquid crystal layer formed on the previously formed cholesteric liquid crystal layer, which achieves good polarization characteristics of a laminated body of cholesteric liquid crystal layers. Furthermore, interference unevenness that may be derived from the unevenness of the thickness of the adhesive layer is not observed.

The thickness of the cholesteric liquid crystal layer is preferably 0.2 to 10 μm, more preferably 0.3 to 8.0 μm, and further preferably 0.4 to 6.0 μm. The total thickness of the cholesteric liquid crystal layers in the projection image-displaying member is preferably 1.0 to 30 μm, more preferably 1.5 to 25 μm, and further preferably 2.0 to 20 μm.

The projection image-displaying member has a high visible light transmittance maintained without decreasing the thickness of the cholesteric liquid crystal layer.

Method for Producing Cholesteric Liquid Crystal Layer

Hereafter, a material for the cholesteric liquid crystal layer and a method for producing the cholesteric liquid crystal layer will be described.

The material used for forming the cholesteric liquid crystal layer is, for example, a liquid crystal composition including a polymerizable liquid crystal compound and a chiral agent (optically active compound). The above-described liquid crystal composition that is optionally further mixed with, for example, a surfactant or a polymerization initiator and dissolved in a solvent or the like is applied onto, for example, a support, an alignment layer, and a cholesteric liquid crystal layer to serve as an underlayer. After cholesteric alignment is matured, the alignment can be fixed by curing the liquid crystal composition to form a cholesteric liquid crystal layer.

Polymerizable Liquid Crystal Compound

The polymerizable liquid crystal compound may be a rod-like liquid crystal compound or a disc-like liquid crystal compound, but is preferably a rod-like liquid crystal compound.

The rod-like polymerizable liquid crystal compound for forming the cholesteric liquid crystal layer is, for example, a rod-like nematic liquid crystal compound. Preferred examples of the rod-like nematic liquid crystal compound include azomethines, azoxies, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenyl cyclohexylbenzonitriles. Not only low-molecular-weight liquid crystal compounds, but also high-molecular-weight liquid crystal compounds can be used.

The polymerizable liquid crystal compound is obtained by introducing a polymerizable group into a liquid crystal compound. Examples of the polymerizable group include unsaturated polymerizable groups, an epoxy group, and an aziridinyl group. Unsaturated polymerizable groups are preferred and ethylenically unsaturated polymerizable groups are particularly preferred. The polymerizable group can be introduced into a molecule of a liquid crystal compound by various methods. The number of polymerizable groups in the polymerizable liquid crystal compound is preferably 1 to 6 and more preferably 1 to 3 in one molecule. Examples of the polymerizable liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A. Two or more polymerizable liquid crystal compounds may be used in combination. The combined use of two or more polymerizable liquid crystal compounds enables alignment at low temperature.

The amount of the polymerizable liquid crystal compound in the liquid crystal composition is preferably 80 to 99.9 mass %, more preferably 85 to 99.5 mass %, and particularly preferably 90 to 99 mass % relative to the mass of solids (the mass excluding the mass of solvent) in the liquid crystal composition.

To improve the visible light transmittance, the first selectively reflecting layer 12G may have low Δn. The first selectively reflecting layer 12G having low Δn can be formed by using a low-Δn polymerizable liquid crystal compound. Hereafter, the low-Δn polymerizable liquid crystal compound will be specifically described.

Low-Δn Polymerizable Liquid Crystal Compound

By forming a cholesteric liquid crystal phase using the low-Δn polymerizable liquid crystal compound and fixing the cholesteric liquid crystal phase to form a film, a narrow-band selectively reflecting layer can be obtained. Examples of the low-Δn polymerizable liquid crystal compound include compounds described in WO2015/115390A, WO2015/147243A, WO2016/035873A, JP2015-163596A, and JP2016-53149A. For the liquid crystal composition used to form a selectively reflecting layer having a small half-width, the description in WO2016/047648A can also be referred to.

The liquid crystal compound is also preferably a polymerizable compound represented by formula (I) below in WO2016/047648A.

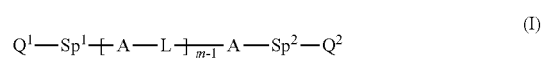

In the formula (I), A represents a phenylene group that may have a substituent or a trans-1,4-cyclohexylene group that may have a substituent, L represents a linking group selected from the group consisting of a single bond, —CH$_2$O—, —OCH$_2$—, —(CH$_2$)$_2$OC(=O)—, —C(=O)O (CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a linking group selected from the group consisting of a single bond, a linear or branched alkylene group having 1 to 20 carbon atoms, and a group in which one or two or more —CH$_2$— in a linear or branched alkylene group having 1 to 20 carbon atoms are substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by formula Q-1 to formula Q-5 below, where one of Q$^1$ and Q$^2$ represents a polymerizable group.

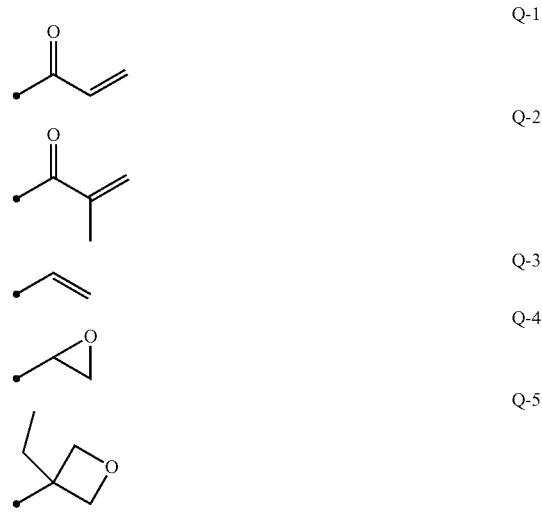

The phenylene group in the formula (I) is preferably a 1,4-phenylene group.

The substituent employed when the phenylene group and the trans-1,4-cyclohexylene group "may have a substituent" is not particularly limited. Examples of the substituent include an alkyl group, a cycloalkyl group, an alkoxy group, an alkyl ether group, an amide group, an amino group, a halogen atom, and a substituent selected from the group consisting of groups obtained by combining two or more of the above-mentioned substituents. The substituent is also, for example, a substituent represented by —C(=O)—$X^3$-$Sp^3$-$Q^3$ described later. The phenylene group and the trans-1,4-cyclohexylene group may have 1 to 4 substituents. When two or more substituents are included, the two or more substituents may be the same or different.

The alkyl group may be a linear or branched alkyl group. The number of carbon atoms of the alkyl group is preferably 1 to 30, more preferably 1 to 10, and further preferably 1 to 6. Examples of the alkyl group include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a 1,1-dimethylpropyl group, a n-hexyl group, an isohexyl group, a linear or branched heptyl group, an octyl group, a nonyl group, a decyl group, an undecyl group, and a dodecyl group. For the above description regarding the alkyl group, the same applies to an alkoxy group including an alkyl group. The alkylene group is specifically, for example, a divalent group obtained by removing any one hydrogen atom from the alkyl group exemplified above. Examples of the halogen atom include a fluorine atom, a chlorine atom, a bromine atom, and an iodine atom.

The number of carbon atoms of the cycloalkyl group is preferably 3 to 20 and more preferably 5 or more and is preferably 10 or less, more preferably 8 or less, and further preferably 6 or less. Examples of the cycloalkyl group include a cyclopropyl group, a cyclobutyl group, a cyclopentyl group, a cyclohexyl group, a cycloheptyl group, and a cyclooctyl group.

The substituent that may be included in the phenylene group and the trans-1,4-cyclohexylene group is particularly preferably a substituent selected from the group consisting of an alkyl group, an alkoxy group, and —C(=O)—$X^3$-$Sp^3$-$Q^3$. Herein, $X^3$ represents a single bond, —O—, —S—, or —N($Sp^4$-$Q^4$)- or represents a nitrogen atom that forms a ring structure with $Q^3$ and $Sp^3$. $Sp^3$ and $Sp^4$ each independently represent a linking group selected from the group consisting of a single bond, a linear or branched alkylene group having 1 to 20 carbon atoms, and a group in which one or two or more —$CH_2$— in a linear or branched alkylene group having 1 to 20 carbon atoms are substituted with —O—, —S—, —NH—, —N($CH_3$)—, —C(=O)—, —OC(=O)—, or —C(=O)O—.

$Q^3$ and $Q^4$ each independently represent a hydrogen atom, a cycloalkyl group, a group in which one or two or more —$CH_2$— in a cycloalkyl group are substituted with —O—, —S—, —NH—, —N($CH_3$)—, —C(=O)—, —OC(=O)—, or —C(=O)O—, or a polymerizable group selected from the group consisting of the groups represented by the formula Q-1 to the formula Q-5.

Specific examples of the group in which one or two or more —$CH_2$— in a cycloalkyl group are substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. The substitution position is not particularly limited. Among them, a tetrahydrofuranyl group is preferred and a 2-tetrahydrofuranyl group is particularly preferred.

In the formula (I), L represents a linking group selected from the group consisting of a single bond, —$CH_2$O—, —$OCH_2$—, —$(CH_2)_2$OC(=O)—, —C(=O)O$(CH_2)_2$—, —C(=O)O—, —OC(=O)—, —OC(=O)O—, —CH=CH—C(=O)O—, and —OC(=O)—CH=CH—. L preferably represents —C(=O)O— or —OC(=O)—. L with the number of m−1 may be the same or different.

$Sp^1$ and $Sp^2$ each independently represent a linking group selected from the group consisting of a single bond, a linear or branched alkylene group having 1 to 20 carbon atoms, and a group in which one or two or more —$CH_2$— in a linear or branched alkylene group having 1 to 20 carbon atoms are substituted with —O—, —S—, —NH—, —N($CH_3$)—, —C(=O)—, —OC(=O)—, or —C(=O)O—. $Sp^1$ and $Sp^2$ preferably each independently represent a linear alkylene group that has 1 to 10 carbon atoms and has both terminals to which a linking group selected from the group consisting of —O—, —OC(=O)—, and —C(=O)O— bonds or a linking group obtained by combining one or two or more groups selected from the group consisting of —OC(=O)—, —C(=O)O—, —O—, and a linear alkylene group having 1 to 10 carbon atoms. $Sp^1$ and $Sp^2$ preferably each independently represent a linear alkylene group that has 1 to 10 carbon atoms and has both terminals to which —O— bonds.

$Q^1$ and $Q^2$ each independently represent a hydrogen atom or a polymerizable group selected from the group consisting of the groups represented by the formula Q-1 to the formula Q-5, where one of $Q^1$ and $Q^2$ represents a polymerizable group.

The polymerizable group is preferably an acryloyl group (formula Q-1) or a methacryloyl group (formula Q-2).

In the formula (I), m represents an integer of 3 to 12, preferably an integer of 3 to 9, more preferably an integer of 3 to 7, further preferably an integer of 3 to 5.

The polymerizable compound represented by the formula (I) preferably includes, as A, at least one phenylene group that may have a substituent and at least one trans-1,4-cyclohexylene group that may have a substituent. The polymerizable compound represented by the formula (I) preferably includes, as A, 1 to 4 trans-1,4-cyclohexylene groups that may have a substituent, more preferably 1 to 3 trans-1,4-cyclohexylene groups that may have a substituent, further preferably 2 or 3 trans-1,4-cyclohexylene groups that may have a substituent. The polymerizable compound represented by the formula (I) preferably includes, as A, one or more phenylene groups that may have a substituent, more preferably 1 to 4 phenylene groups that may have a substituent, further preferably 1 to 3 phenylene groups that may have a substituent, particularly preferably 2 or 3 phenylene groups that may have a substituent.

In the formula (I), when a number obtained by dividing the number of trans-1,4-cyclohexylene groups represented by A by m is defined as mc, mc preferably satisfies 0.1<mc<0.9, more preferably 0.3<mc<0.8, and further preferably 0.5<mc<0.7. The liquid crystal composition preferably includes a polymerizable compound represented by the formula (I) and satisfying 0.1<mc<0.3 in addition to a polymerizable compound represented by the formula (I) and satisfying 0.5<mc<0.7.

Specific examples of the polymerizable compound represented by the formula (I) include compounds described in paragraphs 0051 to 0058 in WO2016/047648A and compounds described in JP2013-112631A, JP2010-70543A, JP4725516B, WO2015/115390A, WO2015/147243A, WO2016/035873A, JP2015-163596A, and JP2016-53149A.

Chiral Agent: Optically Active Compound

The chiral agent has a function of inducing a helical structure of the cholesteric liquid crystal phase. The chiral compound may be selected in accordance with the purpose because the helical sense or helical pitch to be induced varies depending on the compound.

The chiral agent is not particularly limited, and publicly known compounds can be used. Examples of the chiral agent include compounds described in Liquid Crystal Device Handbook (chapter 3, section 4-3, Chiral Agent for TN and STN, p. 199, edited by 142nd Committee of Japan Society for the Promotion of Science, 1989), JP2003-287623A, JP2002-302487A, JP2002-80478A, JP2002-80851A, JP2010-181852A, and JP2014-034581A.

Although chiral agents generally include asymmetric carbon atoms, axial asymmetric compounds or planar asymmetric compounds, which include no asymmetric carbon atoms, can also be used as chiral agents. Examples of axial asymmetric compounds or planar asymmetric compounds include binaphthyls, helicenes, paracyclophanes, and derivatives thereof. The chiral agent may have a polymerizable group. When the chiral agent and the liquid crystal compound each have a polymerizable group, a polymer having a repeating unit derived from the polymerizable liquid crystal compound and a repeating unit derived from the chiral agent can be formed by the polymerization reaction between the polymerizable chiral agent and the polymerizable liquid crystal compound. In this case, the polymerizable group of the polymerizable chiral agent is preferably the same type of group as the polymerizable group of the polymerizable liquid crystal compound. Therefore, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

The chiral agent may be a liquid crystal compound.

Preferred examples of the chiral agent include isosorbide derivatives, isomannide derivatives, and binaphthyl derivatives. The isosorbide derivative may be a commercially available product such as LC756 manufactured by BASF.

The content of the chiral agent in the liquid crystal composition is preferably 0.01 mol % to 200 mol % and more preferably 1 mol % to 30 mol % relative to the amount of the polymerizable liquid crystal compound.

Polymerization Initiator

The liquid crystal composition preferably contains a polymerization initiator. In the case where polymerization reaction is caused to proceed through ultraviolet irradiation, the polymerization initiator used is preferably a photopolymerization initiator capable of initiating polymerization reaction through ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimers and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (JP1988-40799B (JP-S63-40799B), JP1993-29234B (JP-H05-29234B), JP1998-95788A (JP-H10-95788A), and JP1998-29997A (JP-H10-29997A), JP2001-233842A, JP2000-80068A, JP2006-342166A, JP2013-114249A, JP2014-137466A, JP4223071B, JP2010-262028A, and JP2014-500852A), oxime compounds (described in JP2000-66385A and JP4454067B), and oxadiazole compounds (described in U.S. Pat. No. 4,212,970A). For example, the description in paragraphs 0500 to 0547 of JP2012-208494A can also be taken into consideration.

The polymerization initiator is also preferably an acylphosphine oxide compound or an oxime compound.

The acylphosphine oxide compound is, for example, a commercially available IRGACURE 810 (compound name: bis(2,4,6-trimethylbenzoyl)-phenylphosphine oxide) manufactured by BASF Japan. Examples of the oxime compound include commercially available products such as IRGACURE OXE01 (manufactured by BASF), IRGACURE OXE02 (manufactured by BASF), TR-PBG-304 (manufactured by Changzhou Tronly New Electronic Materials Co., Ltd.), ADEKA ARKLS NCI-831, ADEKA ARKLS NCI-930 (manufactured by ADEKA Corporation), and ADEKA ARKLS NCI-831 (manufactured by ADEKA Corporation).

The polymerization initiators may be used alone or in combination of two or more.

The content of the photopolymerization initiator in the liquid crystal composition is preferably 0.1 mass % to 20 mass % and more preferably 0.5 mass % to 5 mass % relative to the content of the polymerizable liquid crystal compound.

Crosslinking Agent

The liquid crystal composition may optionally contain a crosslinking agent to improve the film hardness and durability after curing. Crosslinking agents that are curable by, for example, ultraviolet rays, heat, or moisture can be suitably used.

The crosslinking agent is not particularly limited, and can be appropriately selected in accordance with the purpose. Examples of the crosslinking agent include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having oxazoline side groups; and alkoxysilane compounds such as vinyltrimethoxysilane and N-(2-aminoethyl)3-aminopropyltrimethoxysilane. Furthermore, a publicly known catalyst can be used in accordance with the reactivity of the crosslinking agent. This can improve the productivity in addition to the film hardness and the durability. These crosslinking agents may be used alone or in combination of two or more.

The content of the crosslinking agent is preferably 3 mass % to 20 mass % and more preferably 5 mass % to 15 mass %. When the content of the crosslinking agent is 3 mass % or more, the crosslinking density can be improved. When the content of the crosslinking agent is 20 mass % or less, deterioration of the stability of the cholesteric liquid crystal layer can be prevented.

The term "(meth)acrylate" refers to "one or both of acrylate and methacrylate".

Alignment Controlling Agent

The liquid crystal composition may contain an alignment controlling agent that contributes to stably or rapidly providing a cholesteric liquid crystal layer having planar alignment. Examples of the alignment controlling agent include fluorine (meth)acrylate polymers described in paragraphs [0018] to [0043] of JP2007-272185A, compounds represented by formulae (I) to (IV) described in paragraphs [0031] to [0034] of JP2012-203237A, and compounds described in JP2013-113913A.

The alignment controlling agents may be used alone or in combination of two or more.

The amount of the alignment controlling agent in the liquid crystal composition is preferably 0.01 mass % to 10 mass %, more preferably 0.01 mass % to 5 mass %, and particularly preferably 0.02 mass % to 1 mass % relative to the total mass of the polymerizable liquid crystal compound.

Other Additives

The liquid crystal composition may further contain at least one selected from the group consisting of various additives such as surfactants for adjusting the surface tension of a coating to make the thickness uniform and polymerizable monomers. The liquid crystal composition may further optionally contain, for example, a polymerization inhibitor, an antioxidant, an ultraviolet absorber, a light stabilizer, a coloring material, and fine metal oxide particles to the degree that the optical performance is not degraded.

The cholesteric liquid crystal layer can be formed by the following method. A liquid crystal composition prepared by dissolving a polymerizable liquid crystal compound, a polymerization initiator, an optionally added chiral agent, an optionally added surfactant, and the like in a solvent is applied onto a support, an alignment layer, a cholesteric liquid crystal layer produced in advance, or the like. The liquid crystal composition is dried to obtain a coating. The coating is irradiated with active rays to polymerize the cholesteric liquid crystal composition. Thus, a cholesteric liquid crystal layer whose cholesteric regularity is fixed is obtained. A laminated film constituted by a plurality of cholesteric liquid crystal layers can be formed by repeatedly performing the above production process of the cholesteric liquid crystal layer.

Solvent

The solvent used for preparing the liquid crystal composition is not particularly limited. The solvent can be appropriately selected in accordance with the purpose, and an organic solvent is preferably used.

The organic solvent is not particularly limited and can be appropriately selected in accordance with the purpose. Examples of the organic solvent include ketones, alkyl halides, amides, sulfoxides, heterocyclic compounds, hydrocarbons, esters, and ethers. These organic solvents may be used alone or in combination of two or more. In particular, ketones are preferred in consideration of environmental load.

Coating, Alignment, and Polymerization

The coating method of the liquid crystal composition onto a support, an alignment layer, a cholesteric liquid crystal layer serving as an underlayer, and the like is not particularly limited, and can be appropriately selected in accordance with the purpose. Examples of the coating method include wire bar coating, curtain coating, extrusion coating, direct gravure coating, reverse gravure coating, die coating, spin coating, dip coating, spray coating, and slide coating. Alternatively, a liquid crystal composition that has been applied onto another support may be transferred. By heating the applied liquid crystal composition, liquid crystal molecules are aligned. The heating temperature is preferably 200° C. or lower and more preferably 130° C. or lower. This alignment treatment provides an optical thin film in which the polymerizable liquid crystal compound is twistedly aligned so as to have a helical axis in a direction substantially perpendicular to the film surface.

The aligned liquid crystal compound can be further polymerized to cure the liquid crystal composition. The polymerization may be thermal polymerization or photopolymerization that uses irradiation with light, but is preferably photopolymerization. The irradiation with light is preferably performed by using ultraviolet rays. The irradiation energy is preferably 20 mJ/cm$^2$ to 50 J/cm$^2$ and more preferably 100 mJ/cm$^2$ to 1,500 mJ/cm$^2$.

To facilitate the photopolymerization reaction, the irradiation with light may be performed under heating conditions or in a nitrogen atmosphere. The wavelength of ultraviolet rays applied is preferably 350 to 430 nm. The rate of polymerization reaction is preferably as high as possible from the viewpoint of stability. The rate of polymerization reaction is preferably 70% or more and more preferably 80% or more. The rate of polymerization reaction can be determined by measuring the consumption rate of polymerizable functional groups using an infrared absorption spectrum.

Linearly Polarized Light Reflection Layer

The selectively reflecting layer may be a linearly polarized light reflection layer as long as the linearly polarized light reflection layer has the same reflective characteristics as the above-described selectively reflecting layer. The linearly polarized light reflection layer is, for example, a polarizer in which thin films having different refractive index anisotropies are laminated. Such a polarizer has a high visible light transmittance like the cholesteric liquid crystal layer and can reflect, at a wavelength with high luminosity, projection light that obliquely enters the polarizer during operation of a head-up display system.

The polarizer in which thin films having different refractive index anisotropies are laminated is, for example, a polarizer described in JP1997-506837A (JP-H09-506837A). Specifically, when processing is performed under selected conditions so as to obtain the refractive-index relation, various materials may be employed to form the polarizer. In general, one of first materials needs to have, in a selected direction, a refractive index different from that of a second material. This difference between the refractive indices can be provided by various methods such as drawing during formation of a film or after formation of a film, extrusion molding, or coating. In addition, the two materials preferably have similar rheological characteristics (for example, melt viscosity) so as to be extruded simultaneously.

A commercially available polarizer can be used as the polarizer in which thin films having different refractive index anisotropies are laminated. The commercially available polarizer may be a laminated body of a reflective polarizing plate and a temporary support. Examples of the commercially available polarizer include commercially available optical films such as DBEF (registered trademark) (manufactured by 3M) and APF (Advanced Polarizing Film (manufactured by 3M)).

It is sufficient that the thickness of the reflective polarizing plate is preferably 2.0 to 50 μm and more preferably 8.0 to 30 μm.

To achieve a front transmittance of 70% or more, the difference between the first maximum refractive index and the second refractive index is desirably 0.1 or more, and the number of layers is desirably 4 to 20.

Polarization Converting Layer

The polarization converting layer includes a first polarization converting layer, at least one selectively reflecting layer, and a second polarization converting layer disposed in this order. In particular, it is sufficient for the projection image-displaying member that the first polarization converting layer 14, the selectively reflecting layer 12, and the second polarization converting layer 11 are disposed in this order from the visual side as illustrated in FIG. 1.

In the present invention, the first polarization converting layer 14 and the second polarization converting layer 11 satisfy all relational expressions (i) to (v) below. When the projection image-displaying member includes such a polarization converting layer, the suitability for polarizing sunglasses that screen out s-polarized light, which is a main component of glare caused by light reflected from the hood of cars in the opposite lane or puddles, can be improved. Moreover, this suppresses formation of double images. In particular, formation of double images caused when a projection image is formed through incidence of p-polarized light can be favorably suppressed.

The reason why the suitability for polarizing sunglasses can be improved by providing the polarization converting layer is as follows. The polarization converting layer has a helical structure of a cholesteric liquid crystal phase and exhibits optical rotation and birefringence for visible light having a shorter wavelength than the reflection peak wavelength in an infrared region. Therefore, polarization in a visible region can be controlled. In particular, s-polarized light incident from the outside of a glass considerably changes in accordance with the film structure including a retardation layer. Therefore, the suitability for polarizing sunglasses can be improved by controlling the number of pitches and the film thickness of the polarization converting layer such that optical compensation can be achieved by the polarization converting layer. Specifically, the first polarization converting layer and the second polarization converting layer perform optical compensation such that s-polarized light incident from the outside of a glass is allowed to pass through the glass while s-polarization is maintained.

The reason why the performance of screening out s-polarized light obliquely incident from the outside of a glass can be improved is assumed to be as follows. For a λ/4 retardation layer typically used for converting polarization, the angle of light incident with respect to the slow axis varies, and thus the effect of polarization conversion considerably varies depending on the angle. On the other hand, the polarization converting layer having a helical structure of a cholesteric liquid crystal phase has no unique direction of liquid crystal, and thus the effect of polarization conversion does not readily vary even when the angle of incident light varies.

The reason why formation of double images can be further suppressed by disposing the polarization converting layer is assumed to be as follows. Formation of double images based on the fact that light having a wavelength outside the selective reflection range of the cholesteric liquid crystal layer is subjected to polarization conversion at the cholesteric liquid crystal layer and thus reflected at the back surface of the windshield glass can be suppressed.

In the present invention, the polarization converting layer is a layer formed by fixing a helical alignment structure of a liquid crystal compound. When the number of pitches of the helical structure of the first polarization converting layer is $x_1$ and the film thickness is $y_1$ (unit: μm), and the number of pitches of the helical structure of the second polarization converting layer is $x_2$ and the film thickness is $y_2$ (unit: μm), the polarization converting layer satisfies all relational expressions below.

First Polarization Converting Layer:

$0.3 \leq x_1 \leq 2.0$ and  (i)

$y_1 \geq 1.86 x_1 + 0.13$.  (ii)

Second Polarization Converting Layer:

$0.25 \leq x_2 \leq 2.0$,  (iii)

$y_2 \leq 1.37 x_2 + 5.5$, and  (iv)

$y_2 \geq 1.37 x_2 + 0.25$.  (v)

Assuming that the number of pitches is 1 when the helical structure rotates 360 degrees, the first polarization converting layer preferably has a number of pitches of 0.3 to 2.0 and a film thickness of 0.5 to 10.0 μm, more preferably has a number of pitches of 0.4 to 1.5 and a film thickness of 0.8 to 8.0 μm, and further preferably has a number of pitches of 0.5 to 1.0 and a film thickness of 1.0 to 6.0 μm.

The second polarization converting layer preferably has a number of pitches of 0.25 to 2.0 and a film thickness of 0.5 to 8.0 μm, more preferably has a number of pitches of 0.3 to 1.8 and a film thickness of 0.7 to 7.0 μm, and further preferably has a number of pitches of 0.4 to 1.6 and a film thickness of 0.9 to 5.0 μm.

Although described in Examples later, the polarization converting layer can be basically formed in the same manner as the above-described cholesteric liquid crystal layer.

Herein, when the polarization converting layer is formed, the liquid crystal compound used, the chiral agent used, the amount of chiral agent added, the film thickness, and the like need to be adjusted such that the number of pitches x and the film thickness y of the helical structure in the polarization converting layer satisfy the relational expressions (i) to (v).

Each of the polarization converting layers and selectively reflecting layers may be independently formed and then laminated by boding each layer or may be directly formed on a layer serving as an underlayer in the laminate order. For example, a first polarization converting layer may be formed on a support, then a selectively reflecting layer constituted by a cholesteric liquid crystal layer may be formed on the first polarization converting layer, and furthermore a second polarization converting layer may be formed on the selectively reflecting layer.

The twisted direction of the helical structure of the first polarization converting layer may be the same as or different from that of the helical structure of the second polarization converting layer. When the selectively reflecting layer is a cholesteric liquid crystal layer, the twisted direction of the helical structure of the first polarization converting layer and the second polarization converting layer may be the same as or different from that of the helical structure of the selectively reflecting layer. From the viewpoint of suitability for production, the first polarization converting layer, the second polarization converting layer, and the selectively reflecting layer preferably has the same twisted direction of the helical structure.

Other Layers

The projection image-displaying member may include other layers in addition to the selectively reflecting layer, the first polarization converting layer, and the second polarization converting layer. The other layers are each preferably transparent in the visible light range.

The other layers each preferably have low birefringence. The low birefringence means that the front retardation is 10 nm or less in a wavelength range in which the projection image-displaying member of the windshield glass according to an embodiment of the present invention exhibits reflection. The front retardation is preferably 5 nm or less. Furthermore, the difference between the refractive indices of the other layers and the average refractive index (in-plane average refractive index) of the cholesteric liquid crystal layers is preferably small. Examples of the other layers include a support, an alignment layer, and an adhesive layer.

Support

The support can be used as a substrate for forming the first polarization converting layer or as a substrate for forming the cholesteric liquid crystal layer so as to also serve as a first polarization converting layer.

The material for the support is not particularly limited. The support used for forming a cholesteric liquid crystal layer or a first polarization converting layer may be a temporary support that is peeled off after formation of the cholesteric liquid crystal layer, and is not necessarily included in the completed projection image-displaying member or windshield glass. The support is a plastic film of, for example, polyester such as polyethylene terephthalate (PET), polycarbonate, acrylic resin, epoxy resin, polyurethane, polyamide, polyolefin, cellulose derivatives, or silicone. The temporary support may be formed of glass instead of the above plastic film.

The thickness of the support may be about 5.0 to 1000 µm, and is preferably 10 to 250 µm and more preferably 15 to 90 µm.

Instead of peeling off the temporary support, when the completed projection image-displaying member or windshield glass includes a support, the support is preferably transparent in the visible light range. When the support is used as a substrate for forming the first polarization converting layer, the support preferably has low birefringence.

Alignment Layer

The projection image-displaying member may include an alignment layer as an underlayer to which the liquid crystal composition is applied when the cholesteric liquid crystal layer or the first polarization converting layer is formed.

The alignment layer can be provided by means of rubbing treatment of an organic compound such as a polymer (resin such as polyimide, polyvinyl alcohol, polyester, polyarylate, polyamide-imide, polyetherimide, polyamide, or modified polyamide), oblique deposition of an inorganic compound, formation of a layer having microgrooves, or accumulation of an organic compound (e.g., w-tricosanoic acid, dioctadecylmethylammonium chloride, or methyl stearate) by the Langmuir-Blodgett method (LB film). Furthermore, an alignment layer whose alignment function is activated by application of an electric field, application of a magnetic field, or irradiation with light may be used.

In particular, preferably, an alignment layer formed of a polymer is subjected to rubbing treatment and then the liquid crystal composition is applied onto the surface subjected to the rubbing treatment. The rubbing treatment can be performed by rubbing a surface of a polymer layer with paper or cloth in a certain direction.

The liquid crystal composition may be applied onto a surface of the support or a surface of the support subjected to the rubbing treatment without providing an alignment layer.

When the liquid crystal layer is formed using a temporary support, the alignment layer may be peeled off together with the temporary support and does not necessarily constitute the projection image-displaying member.

The thickness of the alignment layer is preferably 0.01 to 5.0 µm and more preferably 0.05 to 2.0 µm.

Adhesive Layer

The adhesive layer may be disposed, for example, between the cholesteric liquid crystal layers, between the cholesteric liquid crystal layer and the first polarization converting layer, between the cholesteric liquid crystal layer and the second polarization converting layer, and between the cholesteric liquid crystal layer and the support. The adhesive layer may also be disposed, for example, between the cholesteric liquid crystal layer and an intermediate film sheet and between the second polarization converting layer and the intermediate film sheet.

The adhesive layer may be any layer formed of an adhesive agent.

From the viewpoint of the type of setting, adhesive agents are classified into hot-melt adhesive agents, thermosetting adhesive agents, photosetting adhesive agents, reaction-setting adhesive agents, and pressure-sensitive adhesive agents requiring no setting. Examples of usable materials for these adhesive agents include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting. From the viewpoint of optical transparency and heat resistance, the material for use is preferably, for example, an acrylate compound, a urethane acrylate compound, or an epoxy acrylate compound.

The adhesive layer may be formed using a high-transparency adhesive transfer tape (OCA tape). The high-transparency adhesive transfer tape may be a commercially available tape for screen image display devices, in particular, a commercially available tape for a surface of a screen image display unit of a screen image display device. Examples of the commercially available tape include an adhesive sheet (e.g., PD-S1) manufactured by PANAC Co., Ltd. and an MHM adhesive sheet manufactured by Nichieikako Co., Ltd.

The thickness of the adhesive layer is preferably 0.5 to 10 µm and more preferably 1.0 to 5.0 µm. The thickness of the adhesive layer formed using the high-transparency adhesive transfer tape may be 10 to 50 µm and is preferably 15 to 30 µm. The adhesive layer preferably has a uniform thickness to suppress the color unevenness or the like of the projection image-displaying member.

Hereafter, a windshield glass and a head-up display system having a projection image-displaying member will be described.

Windshield Glass

A windshield glass having a projection image display function can be provided by using a projection image-displaying member.

The windshield glass refers to a window pane of common vehicles such as cars, trains, airplanes, ships, two-wheeled vehicles, and rides. The windshield glass is preferably used as a windshield present in a direction in which the vehicle travels or a windscreen.

The visible light transmittance of the windshield glass is preferably 70% or more, more preferably more than 70%, further preferably 75% or more, and particularly preferably 80% or more. The above visible light transmittance is preferably satisfied at any position of the windshield glass, and a section at which the projection image is displayed (hereafter referred to as a projection image-displaying section) particularly preferably satisfies the above visible light transmittance. The projection image-displaying member has high visible light transmittance in a wavelength range with high luminosity as described above. Therefore, even when the windshield glass is a typically used glass, the above visible light transmittance can be satisfied.

The windshield glass is not particularly limited, and is appropriately determined in accordance with the object on which the windshield glass is disposed. For example, the windshield glass may have a flat shape or a three-dimensional shape having a curved surface such as a concave surface or a convex surface. In a windshield glass molded for vehicles for use, the top of the windshield glass during normal operation and the surface on the visual side such as the observer side, the driver side, and the inside of a car can be identified.

The windshield glass may have a uniform thickness or a nonuniform thickness in the projection image-displaying section. For example, as in a glass for vehicles described in JP2011-505330A, the windshield glass may have a wedge-shaped section and may include a projection image-displaying section having a nonuniform thickness, but preferably includes a projection image-displaying section having a uniform thickness.

Projection Image-Displaying Section

It is sufficient that the projection image-displaying member is disposed in the projection image-displaying section of the windshield glass.

By disposing the projection image-displaying member on an outer surface of a glass plate of the windshield glass or on an interlayer of the windshield glass having a configuration of laminated glass described later, the projection image-displaying section can be formed. When the projection image-displaying member is disposed on an outer surface of a glass plate of the windshield glass, the projection image-displaying member may be disposed on the visual side or on the side opposite to the visual side when viewed from the glass plate, but is preferably disposed on the visual side. The projection image-displaying member has lower scratch resistance than the glass plate. Therefore, the projection image-displaying member is more preferably disposed on the interlayer to protect the projection image-displaying member.

The projection image-displaying section is a section at which a projection image can be displayed using reflected light, and may be any section as long as a projection image projected from a projector or the like can be displayed in a visible manner.

The projection image-displaying section functions as a combiner of the head-up display system. In the head-up display system, the combiner refers to an optical member that can display, in a visible manner, a screen image projected from a projector while allows simultaneous observation of information or view on the opposite side of the combiner when the combiner is observed from the side on which the screen image is displayed. That is, the combiner has a function as an optical path combiner that performs display through superposition of external light and image light.

The projection image-displaying section may be disposed on the whole surface of the windshield glass or on part of the whole area of the windshield glass, and is preferably disposed on part of the whole area. When the projection image-displaying section is disposed on part of the windshield glass, the projection image-displaying section may be disposed at any position of the windshield glass, but is preferably disposed so that a virtual image is displayed at a position at which an observer such as a driver readily makes a visual identification during operation of the head-up display system. For example, the position of the projection image-displaying section can be determined from the relationship between the position of a driver's seat of a vehicle for use and the position at which the projector is disposed.

The projection image-displaying section may have a flat shape without a curved surface, but may have a curved surface. Alternatively, the projection image-displaying section may have a concave shape or a convex shape on the whole and may display a projection image in an enlarged or reduced view.

Laminated Glass

The windshield glass may have a configuration of laminated glass. The windshield glass may have a configuration in which the projection image-displaying member is disposed between a first glass plate and a second glass plate, and preferably has a configuration in which an intermediate film is disposed between the first glass plate and the projection image-displaying member and/or between the projection image-displaying member and the second glass plate. In the windshield glass, for example, the first glass plate is disposed at a position farther from the visual side and the second glass plate is disposed at a position closer to the visual side.

The glass plate such as the first glass plate or the second glass plate may be a glass plate typically used for windshield glasses. For example, a glass plate having a visible light transmittance of 80% or less, for example, 73% or 76%, such as a green glass having good heat-shielding properties may be used. Even when such a glass plate having a low visible light transmittance is used, a windshield glass having a visible light transmittance of 70% or more even at the projection image-displaying section can be produced by using the projection image-displaying member.

The thickness of the glass plate is not particularly limited, and may be about 0.5 to 5.0 mm and is preferably 1.0 to 3.0 mm and more preferably 2.0 to 2.3 mm. The materials and thicknesses of the first glass plate and the second glass plate may be the same or different.

The windshield glass having a configuration of laminated glass can be produced by a publicly known method for producing a laminated glass. In general, the windshield glass can be produced by sandwiching an intermediate film sheet for laminated glass between two glass plates, then repeatedly performing heat treatment and pressure treatment (e.g., treatment using a rubber roller) several times, and finally performing heat treatment under pressure conditions using an autoclave or the like.

The windshield glass having a configuration of laminated glass including the projection image-displaying member in the intermediate film may be produced by forming a projection image-displaying member on a surface of a glass plate and then performing a typical laminated glass production process, or may be produced by performing the above-described heat treatment and pressure treatment using, as an intermediate film sheet, a laminated intermediate film sheet for laminated glass including the projection image-displaying member. When the projection image-displaying member is formed on the surface of the glass plate, the glass plate on which the projection image-displaying member is to be formed may be a first glass plate or a second glass plate. At this time, the projection image-displaying member is bonded to the glass plate using, for example, an adhesive agent.

Intermediate Film Sheet

In the case where the intermediate film sheet does not include the above-described projection image-displaying member, the intermediate film sheet may be any publicly known intermediate film sheet. The intermediate film sheet may be, for example, a resin film including a resin selected from the group consisting of polyvinyl butyral (PVB), ethylene-vinyl acetate copolymers, and chlorine-containing resins. The above resin is preferably a main component of the intermediate film sheet. The main component refers to a component having a content of 50 mass % or more in the intermediate film sheet.

Among the above resins, polyvinyl butyral or an ethylene-vinyl acetate copolymer is preferably used, and polyvinyl butyral is more preferably used. The resin is preferably a synthetic resin.

The polyvinyl butyral can be obtained by acetalizing polyvinyl alcohol with butyraldehyde. The lower limit of the degree of acetalization of polyvinyl butyral is preferably 40% and more preferably 60%. The upper limit of the degree of acetalization of polyvinyl butyral is preferably 85% and more preferably 75%.

The polyvinyl alcohol is normally obtained by saponifying polyvinyl acetate, and a polyvinyl alcohol having a degree of saponification of 80 to 99.8 mol % is generally used.

The lower limit of the degree of polymerization of the polyvinyl alcohol is preferably 200 and the upper limit of the degree of polymerization is preferably 3000. When the degree of polymerization of the polyvinyl alcohol is 200 or more, the penetration resistance of a laminated glass to be obtained does not readily deteriorate. When the degree of polymerization is 3000 or less, good moldability of a resin film is achieved and the stiffness of the resin film does not excessively increase, which provides good workability. The lower limit of the degree of polymerization is more preferably 500, and the upper limit of the degree of polymerization is more preferably 2000.

Intermediate Film Sheet Including Projection Image-Displaying Member

The laminated intermediate film sheet for laminated glass including a projection image-displaying member can be formed by bonding the projection image-displaying member to the surface of the intermediate film sheet. Alternatively, the laminated intermediate film sheet can be formed by sandwiching the projection image-displaying member between two of the intermediate film sheets. The two intermediate film sheets may be the same or different, but are preferably the same.

The projection image-displaying member and the intermediate film sheets can be bonded to each other by a publicly known bonding method, and laminate treatment is preferably employed. When the laminate treatment is performed, the laminate treatment is preferably performed under certain heating and pressure conditions to prevent the separation between the laminated body and the intermediate film sheet after the treatment.

To stably perform the laminate treatment, the film surface temperature of the intermediate film sheet on the side to which the projection image-displaying member is bonded is preferably 50 to 130° C. and more preferably 70 to 100° C.

Pressure is preferably applied during the laminate treatment. The pressure conditions are preferably less than 2.0 kg/cm$^2$ (less than 196 kPa), more preferably 0.5 to 1.8 kg/cm$^2$ (49 to 176 kPa), and further preferably 0.5 to 1.5 kg/cm$^2$ (49 to 147 kPa).

For the projection image-displaying member including a support, the support may be peeled off during the laminate treatment, immediately after the laminate treatment, or immediately before the laminate treatment. That is, the laminated intermediate film sheet obtained after the laminate treatment does not necessarily include a support.

For example, the method for producing a laminated intermediate film sheet for laminated glass includes:

(1) a first step of bonding a projection image-displaying member to a surface of a first intermediate film sheet to obtain a first laminated body, and (2) a second step of bonding a second intermediate film sheet to a surface of the projection image-displaying member in the first laminated body opposite to the surface on which the first intermediate film sheet is bonded.

In the first step, the support is peeled off while the projection image-displaying member and the first intermediate film sheet are bonded to each other. In the second step, the second intermediate film sheet is bonded to a surface from which the support is peeled off. By this method for producing a laminated intermediate film sheet for laminated glass, a laminated intermediate film sheet for laminated glass not including a support can be produced. By using the laminated intermediate film sheet for laminated glass, a laminated glass not including a support can be easily produced. To stably peel off the support without damage or the like, the temperature of the substrate at which the support is peeled off from the projection image-displaying member is preferably 40° C. or higher and more preferably 40 to 60° C.

Layer on Visual Side Relative to Selectively Reflecting Layer

In general, the projection image-displaying member has a problem in that an image based on reflected light from a layer at which projection light is reflected and an image based on reflected light from the front surface or back surface of the projection image-displaying member viewed from the light incidence side superimpose each other to form double images or multiple images. In the windshield glass, the light that transmits through the selectively reflecting layer is circularly polarized light having a sense opposite to that of circularly polarized light that is reflected by the selectively reflecting layer or polarized light in a direction orthogonal to the selectively reflecting layer. When layers located on the back surface side with respect to the selectively reflecting layer have low birefringence, the reflected light from the back surface does not considerably form double images because polarized light reflected by the selectively reflecting layer is normally the majority. In particular, when polarized light is used as projection light, the majority of the projection light can be reflected by the selectively reflecting layer. In contrast, reflected light from the front surface may considerably cause formation of double images. In particular, double images may be considerably formed when the distance from the center of gravity of the selectively reflecting layer to the front surface of the windshield glass viewed from the light incidence side is a certain distance or longer. Specifically, in the structure of the windshield glass according to an embodiment of the present invention, when the total thickness of layers present on the first polarization converting layer side with respect to the selectively reflecting layer (not including the thickness of the selectively reflecting layer), that is, the distance from the surface of the selectively reflecting layer on the visual side to the surface of the windshield glass on the visual side is 0.5 mm or more, double images are considerably formed. When the distance is 1 mm or more, double images are more considerably formed. When the distance is 1.5 mm or more, double images are further considerably formed. When the distance is 2.0 mm or more, double images are particularly considerably formed. Examples of the layers present on the visual side with respect to the selectively reflecting layer include the first polarization converting layer, the support, the intermediate film sheet, and the second glass plate.

In projection image display that uses p-polarized light described later, however, even when the total thickness of the layers present on the visual side with respect to the selectively reflecting layer is the above thickness, the windshield glass according to an embodiment of the present invention allows visual recognition of a projection image without considerably forming double images.

Head-Up Display System

The windshield glass can be used as a member for the head-up display system. The head-up display system preferably includes a projector.

Projector

The "projector" is an "apparatus that projects light or a screen image", includes a "device that projects a drawn screen image", and emits p-polarized projected light that carries a screen image to be displayed.

In the head-up display system, it is sufficient that the projector is disposed so that p-polarized projected light that carries a screen image to be displayed can enter the projection image-displaying member in the windshield glass at an oblique incidence angle.

In the head-up display system, the projector preferably includes a drawing device and preferably displays, as a virtual image by reflection, a screen image (real image) drawn on a small intermediate image screen using a combiner.

The light emitted from the projector is preferably p-polarized light, and the imaging distance of the virtual image, that is, the imaging position of the virtual image is preferably changeable. The projector may be a projector used for publicly known head-up display systems as long as the projector can emit p-polarized light and the imaging distance of a virtual image is changeable.

Examples of the method for changing the imaging distance of a virtual image in a projector include a method in which a surface (screen) on which a screen image is generated is moved (refer to JP2017-21302A), a method in which a plurality of optical paths having different optical path lengths are switched (refer to WO2015/190157A), a method in which the optical path length is changed by inserting and/or moving mirrors, a method in which the focal length is changed by using a compound lens as an imaging lens, a method in which a projector 22 is moved, a method in which a plurality of projectors having different imaging distances of virtual images are switched and used, and a method in which a variable-focal-length lens is used (refer to WO2010/116912A).

The projector may be a projector in which the imaging distance of a virtual image is continuously changeable or a projector in which the imaging distance of a virtual image can be changed at two or more points.

Herein, the imaging distances of at least two virtual images among virtual images of projected light from the projector are preferably different from each other by 1 m or more. Therefore, when the imaging distance of a virtual image can be continuously changed in the projector, the imaging distance of a virtual image is preferably changeable by 1 m or more. Such a projector is preferably used because the projector can appropriately handle the case where the distance of line of sight of a driver is considerably different between driving at a normal speed on the general road and driving at a high speed on the expressway.

Drawing Device

The drawing device may be a device that displays a screen image by itself or may be a device that emits light capable of drawing a screen image. In the drawing device, it is sufficient that light from a light source is controlled by a drawing method such as use of a light modulator, laser intensity modulation means, or optical deflection means for drawing. The drawing device refers to a device that includes a light source and further includes, for example, a light modulator, laser intensity modulation means, or optical deflection means for drawing in accordance with the drawing method.

Light Source

The light source is not particularly limited, and may be, for example, an LED (light-emitting diode, an organic light-emitting diode (OLED)), a discharge tube, or a laser light source. Among them, an LED and a discharge tube are preferred because they are suitable for a light source of a drawing device that emits linearly polarized light. In particular, an LED is preferred. Since the emission wavelength of LEDs is not continuous in the visible light range, LEDs are suitable for combination with a combiner in which a cholesteric liquid crystal layer that exhibits selective reflection in a particular wavelength range as described later is used.

Drawing Method

The drawing method is not particularly limited, and can be selected in accordance with the light source used or the applications.

Examples of the drawing method include use of a vacuum fluorescent display, an LCD (liquid crystal display) method that uses liquid crystal, an LCOS (liquid crystal on silicon) method, a DLP (registered trademark) (digital light processing) method, and a scanning method that uses laser. The drawing method may be use of a vacuum fluorescent display integrated with a light source. The drawing method is preferably an LCD method.

In the LCD method and the LCOS method, light beams of different colors are modulated and multiplexed in a light modulator, and light is emitted from a projection lens.

The DLP method is a displaying system that uses a DMD (digital micromirror device). Drawing is performed while micromirrors corresponding to pixels are arranged, and light is emitted from a projection lens.

The scanning method is a method in which a screen is scanned with light beams and imaging is performed by using an afterimage effect of eyes (refer to, for example, the descriptions in JP1995-270711A (JP-H07-270711A) and JP2013-228674A). In the scanning method that uses laser, laser beams of different colors (e.g., red beam, green beam, and blue beam) subjected to intensity modulation are bundled into a single light beam with, for example, a multiplexing optical system or a condensing lens. Scanning with the light beam is performed by optical deflection means to perform drawing on an intermediate image screen described later.

In the scanning method, the intensity modulation of laser beams of different colors (e.g., red beam, green beam, and blue beam) may be directly performed by changing the intensity of a light source or may be performed using an external modulator. The optical deflection means is, for example, a galvanometer mirror, a combination of a galvanometer mirror and a polygon mirror, or a MEMS (microelectro-mechanical system) and is preferably a MEMS. The scanning method is, for example, a random scanning method or a raster scanning method and is preferably a raster scanning method. In the raster scanning method, for example, the laser beam can be moved in a horizontal direction using a resonance frequency and in a vertical direction using a saw-tooth wave. Since the scanning method does not require a projection lens, the size of the device is easily reduced.

The light emitted from the drawing device may be linearly polarized light or natural light (unpolarized light). The light emitted from the drawing device included in the head-up display system is preferably linearly polarized light. In the drawing device that uses an LCD or LCOS method as the drawing method and the drawing device that uses a laser light source, the emitted light is essentially linearly polarized light. In the case where the light emitted from the drawing device is linearly polarized light and contains light beams having plural wavelengths (colors), the polarization directions (transmission axis directions) of the plural light beams are preferably the same or orthogonal to each other. It has been known that some commercially available drawing devices have varying polarization directions in the wavelength ranges of emitted red, green, and blue light beams (refer to JP2000-221449A). Specifically, the polarization direction of green beams is known to be orthogonal to the polarization direction of red beams and the polarization direction of blue beams.

Intermediate Image Screen

As described above, the drawing device may be a device that uses an intermediate image screen. The "intermediate image screen" is a screen on which a screen image is drawn. That is, for example, when light emitted from the drawing device is not yet visible as a screen image, the drawing device forms a visible screen image on the intermediate image screen from the light. The screen image drawn on the intermediate image screen may be projected on the combiner using light that passes through the intermediate image screen or using light reflected by the intermediate image screen.

Examples of the intermediate image screen include scattering films, microlens arrays, and rear-projection screens. For example, in the case where the intermediate image screen is made of a plastic material, if the intermediate image screen exhibits birefringence, the polarization plane or light intensity of polarized light that enters the intermediate image screen are disturbed, which easily causes color unevenness or the like in the combiner. However, the color unevenness can be suppressed by using a retardation film having a particular phase difference.

The intermediate image screen preferably has a function of transmitting incident light beams while diverging the incident light beams. This is because the projection image can be displayed in an enlarged view. Such an intermediate image screen is, for example, a screen constituted by a microlens array. The microlens array used in a head-up display is described in, for example, JP2012-226303A, JP2010-145745A, and JP2007-523369A.

The projector may include, for example, a reflecting mirror that adjusts the optical path of projection light formed by the drawing device.

For the head-up display system that uses the windshield glass as a projection image-displaying member, refer to JP1990-141720A (JP-H02-141720A), JP1998-96874A (JP-H10-96874A), JP2003-98470A, U.S. Pat. No. 5,013,134A, and JP2006-512622A.

The windshield glass is particularly useful for head-up display systems used in combination with a projector including, as a light source, a laser having a discrete emission wavelength in the visible light range, an LED, an OLED (organic light-emitting diode), or the like. This is because the selective reflection center wavelength of the cholesteric liquid crystal layer can be controlled in accordance with each emission wavelength. The windshield glass can also be used for projection of a display such as an LCD (liquid crystal display) whose light for display is polarized.

Projection Light (Incident Light)

The incident light is preferably caused to enter the projection image-displaying member at an oblique incidence angle of 45° to 70° with respect to the normal of the projection image-displaying member. The Brewster's angle at an interface between a glass having a refractive index of about 1.51 and air having a refractive index of 1 is about 56°. When p-polarized light is caused to enter the projection image-displaying member in the above-described angle range, only a small amount of incident light for displaying a projection image is reflected by the surface of the windshield glass on the visual side relative to the selectively reflecting layer, which allows display of a screen image that is less susceptible to double images. The above angle is also preferably 50° to 65°. Herein, it is sufficient that the projection image can be observed on the incidence side of projection light at an angle of 45° to 70°, preferably 50° to 65°, symmetrically with respect to the normal of the selectively reflecting layer.

The incident light may enter the windshield glass in any direction, that is, from the top, bottom, left, and right of the windshield glass, and the direction may be determined in accordance with the visual direction. For example, the incident light preferably enters the windshield glass at the above-described oblique incidence angle from the bottom during operation.

As described above, projection light used when a projection image is displayed on a head-up display is preferably p-polarized light that oscillates in a direction parallel to the incidence plane. When light emitted from the projector is not linearly polarized light, the light may be converted into p-polarized light by disposing a linearly polarizing film on the side through which light is emitted from the projector, or the light may be converted into p-polarized light through an optical path from the projector to the windshield glass. As described above, in the projector in which the polarization direction varies in the wavelength ranges of red, green, and blue light beams emitted, the incident light is preferably p-polarized light in the wavelength ranges of all colors by wavelength-selectively controlling the polarization direction.

The head-up display system may be a projection system having a changeable imaging position of a virtual image. Such a projection system is described in, for example, JP2009-150947A. When the imaging position of a virtual image is changeable, a driver can visually recognize the virtual image with more comfort and convenience. The imaging position of a virtual image is a position at which a driver of a vehicle can visually recognize the virtual image, such as a position 1000 mm or more ahead of the windshield glass from the driver. Herein, if the glass is nonuniform (wedge shape) in the projection image-displaying section as described in JP2011-505330A, the angle of the wedge shape needs to be changed when the imaging position of a virtual image is changed. Therefore, as described in, for example, JP2017-15902A, the angle of the wedge shape needs to be partly changed to change the projection position, thereby pretendedly addressing the change in the imaging position of a virtual image. In the head-up display system built by using the windshield glass according an embodiment of the present invention and by using p-polarized light as described above, the wedge-shaped glass is not required, which allows the glass to have a uniform thickness in the projection image-displaying section. Therefore, a projection system in which the imaging position of a virtual image is changeable can be suitably employed.

Next, the head-up display system will be more specifically described with reference to FIG. 3 and FIG. 4.

Figure 3:
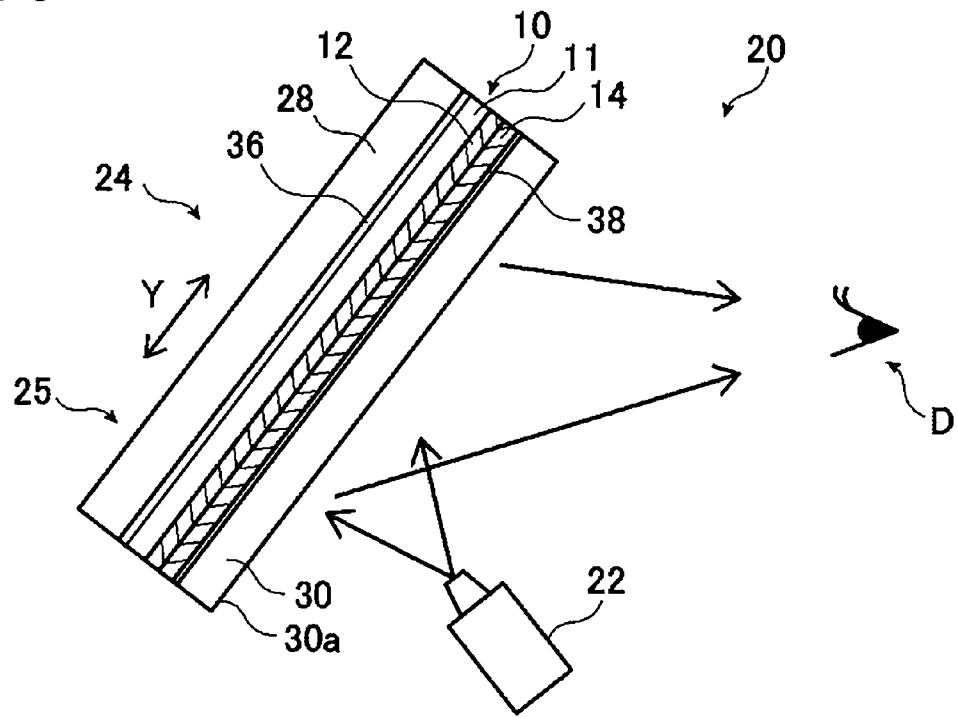
FIG. 3 is a schematic view illustrating an example of a head-up display having a projection image-displaying member according to an embodiment of the present invention.

FIG. 3 is a schematic view illustrating an example of a head-up display having the projection image-displaying member according to an embodiment of the present invention. FIG. 4 is a schematic view illustrating an example of a windshield glass having the projection image-displaying member according to an embodiment of the present invention.

The head-up display system 20 has a projector 22 and a windshield glass 24, and is used for, for example, vehicles such as passenger cars. Each of the constituent elements of the head-up display system 20 has been described above. Hereafter, the head-up display system 20 is also referred to as an HUD 20.

Figure 4:
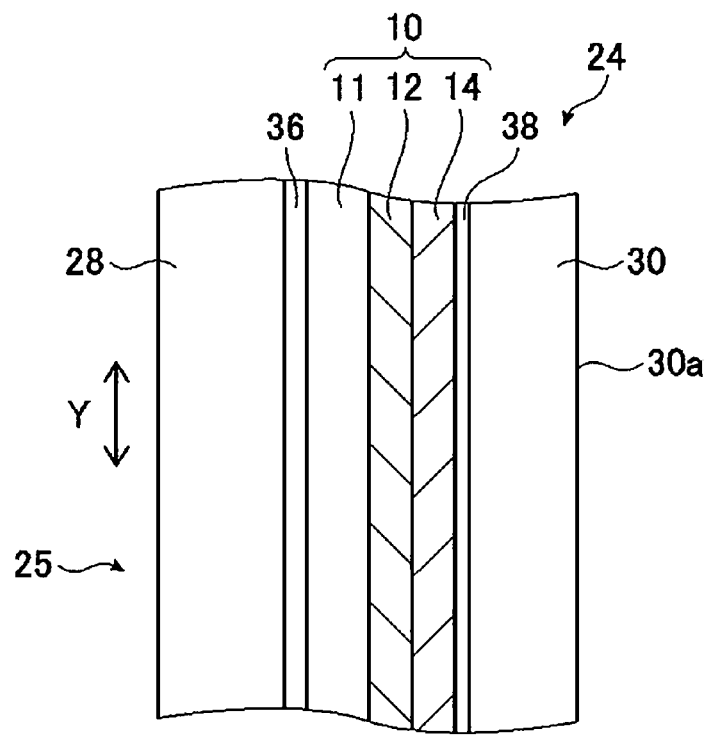
FIG. 4 is a schematic view illustrating an example of a windshield glass having a projection image-displaying member according to an embodiment of the present invention.

In the HUD 20, the windshield glass 24 has a first glass plate 28, a second glass plate 30, a projection image-displaying member 10, an intermediate film 36, and an adhesive layer 38 as conceptually illustrated in FIG. 4. The projection image-displaying member 10 has a second polarization converting layer 11, a selectively reflecting layer 12, and a first polarization converting layer 14. In the HUD 20, the windshield glass 24 and the first polarization converting layer 14 are disposed so that the up and down direction Y of the windshield glass 24 matches the axis H of the first polarization converting layer 14 illustrated in FIG. 2.

The up and down direction Y of the windshield glass 24 is defined as a direction in which the ground side of a vehicle or the like including the windshield glass 24 disposed therein is the lower side and the side opposite to the lower side is the upper side. In the case where the windshield glass 24 is disposed in a vehicle or the like, the windshield glass 24 is sometimes disposed in an inclined manner for the sake of convenience of structure or design. In this case, the up and down direction Y corresponds to a direction along a surface 25 of the windshield glass 24.

The projector 22 has been described above. The projector 22 may be a publicly known projector used for HUDs as long as the projector can emit p-polarized projected light that carries a screen image to be displayed and the imaging distance of a virtual image, that is, the imaging position of a virtual image is changeable.

In the HUD 20, the projector 22 irradiates the windshield glass 24 (second glass plate 30) with p-polarized projected light. If the projected light with which the windshield glass 24 is irradiated by the projector 22 is s-polarized light, a large amount of projected light is reflected by the second glass plate 30 and first glass plate 28 of the windshield glass 24, which disadvantageously causes, for example, observation of double images.

The projector 22 preferably irradiates the windshield with p-polarized projected light at a Brewster's angle. This eliminates the reflection of projected light at the second glass plate 30 and the first glass plate 28, which allows display of a clearer screen image.

The windshield glass 24 is a so-called laminated glass and has an intermediate film 36, a projection image-displaying member 10, and an adhesive layer 38 between the first glass plate 28 and the second glass plate 30.

The projection image-displaying member 10 is obtained by laminating a second polarization converting layer 11, a selectively reflecting layer 12, and a first polarization converting layer 14, and the first polarization converting layer 14 is located on the second glass plate 30 side, that is, on the incidence side of projected light. Projected light enters a surface 30a of the second glass plate 30. The selectively reflecting layer 12 is a main body of the projection image-displaying member 10, and reflects part of incident light and transmits part of incident light like typical half mirrors.

The projection image-displaying member 10 is bonded to the first glass plate 28 using the intermediate film 36 and to the second glass plate 30 using the adhesive layer 38 so as to be sandwiched between the first glass plate 28 and the second glass plate 30.

The first glass plate 28 and second glass plate 30 of the windshield glass 24 are basically disposed in parallel. That is, the section of the windshield glass 24 does not have a wedge shape.

The first glass plate 28 and the second glass plate 30 are each a publicly known glass (glass plate) used for windshields of vehicles or the like. Therefore, for example, the material, the thickness, and the shape may be the same as those of publicly known glasses used for windshields. The first glass plate 28 and the second glass plate 30 illustrated in FIG. 4 each have a plate-like shape, but the shape is not limited thereto. They may partly have a curved surface or may entirely have a curved surface.

The intermediate film 36 is provided to prevent the glass from flying into a car and scattering inside the car when an accident occurs. The intermediate film 36 is also provided to bond the projection image-displaying member 10 and the first glass plate 28 to each other. The intermediate film 36 may be a publicly known interlayer and adhesive layer used for windshields formed of laminated glass. Examples of the material for the intermediate film 36 include polyvinyl butyral (PVB), ethylene-vinyl acetate copolymer, chlorine-containing resin, and polyurethane.

The thickness of the intermediate film 36 is not limited, and may be set to the same thickness as the intermediate film of a publicly known windshield glass in accordance with, for example, the material for the intermediate film 36.

The adhesive layer 38 is a layer formed of a coating-type adhesive agent. The projection image-displaying member 10 is bonded to the second glass plate 30 using the adhesive layer 38.

The adhesive layer 38 is not limited, and may be formed of publicly known various coating-type adhesive agents as long as transparency required as the windshield glass 24 can be ensured and the projection image-displaying member 10 and the glass can be bonded to each other with a necessary adhesive strength. The adhesive layer 38 may be formed of the same material as the intermediate film 36. An example of the material is polyvinyl butyral (PVB). Instead, the adhesive layer 38 may be formed of, for example, an acrylate-based adhesive agent. The adhesive layer 38 may be formed of the same material as the above-described adhesive layer as described below.

The adhesive layer 38 may be formed of an adhesive agent in the same manner as the above-described adhesive layer.

From the viewpoint of the type of setting, adhesive agents are classified into hot-melt adhesive agents, thermosetting adhesive agents, photosetting adhesive agents, reaction-setting adhesive agents, and pressure-sensitive adhesive agents requiring no setting. Examples of usable materials for these adhesive agents include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting. From the viewpoint of optical transparency and heat resistance, the material for use is preferably, for example, an acrylate compound, a urethane acrylate compound, or an epoxy acrylate compound.

The adhesive layer 38 may be formed using a high-transparency adhesive transfer tape (OCA tape). The high-transparency adhesive transfer tape may be a commercially available tape for screen image display devices, in particular, a commercially available tape for a surface of a screen image display unit of a screen image display device. Examples of the commercially available tape include an adhesive sheet (e.g., PD-S1) manufactured by PANAC Co., Ltd. and an MHM adhesive sheet manufactured by Nichieikako Co., Ltd.

The thickness of the adhesive layer 38 is also not limited. Therefore, it is sufficient that the thickness is appropriately set in accordance with the material for the adhesive layer 38 so as to provide a sufficient bonding strength.

Herein, if the adhesive layer 38 is excessively thick, the projection image-displaying member 10 sometimes cannot be bonded to the first glass plate 28 or the second glass plate 30 while the planarity described later is sufficiently maintained. In consideration of this point, the thickness of the adhesive layer 38 is preferably 0.1 to 800 µm and more preferably 0.5 to 400 µm.

For the windshield glass 24, the adhesive layer 38 is disposed between the projection image-displaying member 10 and the second glass plate 30, and the projection image-displaying member 10 and the first glass plate 28 are bonded to each other using the intermediate film 36, but the configuration of the windshield glass 24 is not limited thereto. That is, an adhesive layer may be disposed between the projection image-displaying member 10 and the first glass plate 28, and an intermediate film may be disposed between the projection image-displaying member 10 and the second glass plate 30.

The windshield glass 24 may have a configuration in which the windshield glass 24 does not have the intermediate film 36, and the projection image-displaying member 10 and the first glass plate 28 may be bonded to each other using the adhesive layer 38 and the projection image-displaying member 10 and the second glass plate 30 may be bonded to each other using the adhesive layer 38.

The projection image-displaying member 10 is obtained by laminating a selectively reflecting layer 12, a first polarization converting layer 14, and a second polarization converting layer 11. The projection image-displaying member 10 having the first polarization converting layer 14 is disposed so that the first polarization converting layer 14 faces the second glass plate 30 side, that is, the incidence side of projected light. Therefore, the second polarization converting layer 11 is disposed on the first glass plate 28 side, that is, on the side opposite to the incidence side of projected light.

In the HUD 20, the windshield glass 24 has a configuration in which the projection image-displaying member 10 is included between the first glass plate 28 and the second glass plate 30, the projection image-displaying member 10 (first polarization converting layer 14) is bonded to the second glass plate 30 using the adhesive layer 38, and the projection image-displaying member 10 (second polarization converting layer 11) is bonded to the first glass plate 28 using the intermediate film 36.

As illustrated in FIG. 3, in the HUD 20, an observer of a screen image, that is, a driver D observes a virtual image formed through projection by the projector 22 and reflection by the windshield glass 24.

In a typical HUD, a projected image of a projector is reflected by a glass of a windshield, and the resulting reflected light is observed. Herein, a typical windshield is a laminated glass and has two glasses on the inner surface side and the outer surface side. Therefore, such an HUD poses a problem in that a driver observes double images through reflected light from the two glasses.

To address this problem, in a typical HUD, the section of the windshield (intermediate film) has a wedge shape so that the reflection at the inner-side glass and the reflection at the outer-side glass overlap each other, thus preventing observation of double images.

However, as described above, in a wedge-shaped windshield, if the imaging distance of a virtual image is changed to handle the difference in line of sight of a driver between normal driving with a short line of sight and high-speed driving with a long line of sight, the angle of the wedge of the windshield becomes inappropriate. Consequently, the driver observes a double image.

In contrast, when the windshield glass 24 has the projection image-displaying member 10 between the first glass plate 28 and the second glass plate 30 and the driver D observes reflected light from the projection image-displaying member 10 as in the HUD 20, the reflection of projected light from the projector 22 by the projection image-displaying member 10 is basically dominant. Consequently, double images are basically not formed.

Therefore, in the HUD 20 that uses the projection image-displaying member 10 in the windshield glass 24, the section of the windshield glass 24 (intermediate film 36) does not necessarily have a wedge shape. Thus, even if the imaging distance of a virtual image is changed, double images are not formed.

In one example illustrated in FIG. 3, the intermediate film 36 is disposed only between the projection image-displaying member 10 and the first glass plate 28, and the projection image-displaying member 10 on the second glass plate 30 side is directly bonded to the first glass plate 28 using the adhesive layer 38 formed of a coating-type adhesive agent to ensure the planarity of the projection image-displaying member 10. Thus, an image clarity of 90% or more with an optical comb having a comb width of 0.5 mm and an image clarity of 70% or more with an optical comb having a comb width of 0.125 mm are achieved.

When necessary, the surface of the first glass plate 28 to which the projection image-displaying member 10 is bonded using the intermediate film 36 may be polished to improve the flatness of the surface of the first glass plate 28. The glass can be polished by a publicly known method using a polishing material (e.g., cerium oxide powder) and a polishing device having a polishing pad.

For the image clarity of the windshield glass 24, if at least one of an image clarity of 90% or more with an optical comb having a comb width of 0.5 mm or an image clarity of 70% or more with an optical comb having a comb width of 0.125 mm is not satisfied, the planarity of the projection image-displaying member 10 is insufficient. In this case, the screen image is deformed when the imaging distance of the virtual image is changed.

The image clarity of the windshield glass 24 is preferably 95% or more with an optical comb having a comb width of 0.5 mm and 80% or more with an optical comb having a comb width of 0.125 mm and more preferably 98% or more with an optical comb having a comb width of 0.5 mm and 84% or more with an optical comb having a comb width of 0.125 mm.

The present invention basically has the above configuration. The projection image-displaying member, the windshield glass, and the head-up display system according to embodiments of the present invention have been described in detail. However, the present invention is not limited to the above embodiments. Obviously, various modifications and changes may be made without departing from the spirit of the present invention.

EXAMPLES

Hereafter, the features of the present invention will be further specifically described based on Examples. Materials, reagents, amounts and percentages of substances, operations, and the like used in Examples below can be appropriately changed without departing from the spirit of the present invention. Therefore, the scope of the present invention is not limited to Examples below.

Examples 1 to 3 and Comparative Example 3 were produced by the method described below. In Comparative Example 1, the production was performed in the same manner as in other Examples and Comparative Examples, except that a retardation layer described later was disposed instead of the first polarization converting layer and the second polarization converting layer was not disposed.

In Comparative Example 2, the production was performed in the same manner as in other Examples and Comparative Examples, except that a retardation layer described later was disposed instead of the first polarization converting layer.

In Example 4, the production was performed in the same manner as in other Examples and Comparative Examples, except that the reflection layer was a linearly polarized light reflection layer described later.

In Comparative Example 4, the production was performed in the same manner as in other Examples and Comparative Examples, except that the reflection layer was a linearly polarized light reflection layer described later and the polarization converting layer was not disposed.

Preparation of Coating Liquid

Cholesteric Liquid Crystal Layer-Forming Coating Liquids 1 and 2

A cholesteric liquid crystal layer-forming coating liquid 1 used to form a cholesteric liquid crystal layer that reflects light having a wavelength of 580 nm and a cholesteric liquid crystal layer-forming coating liquid 2 used to form a cholesteric liquid crystal layer that reflects light having a wavelength of 700 nm were prepared by mixing the following components so as to have the following composition.

Cholesteric Liquid Crystal Layer-Forming Coating Liquid
  Mixture 1: 100 parts by mass
  Fluorine-based horizontal alignment agent 1 (alignment controlling agent 1 below): 0.05 parts by mass
  Fluorine-based horizontal alignment agent 2 (alignment controlling agent 2 below): 0.02 parts by mass
  Dextrorotatory chiral agent LC756 (manufactured by BASF): adjusted in accordance with the target reflection wavelength
  Polymerization initiator IRGACURE OXE01 (manufactured by BASF): 1.0 part by mass
  Solvent (methyl ethyl ketone): such an amount that the solute concentration was 20 mass %

•Mixture 1

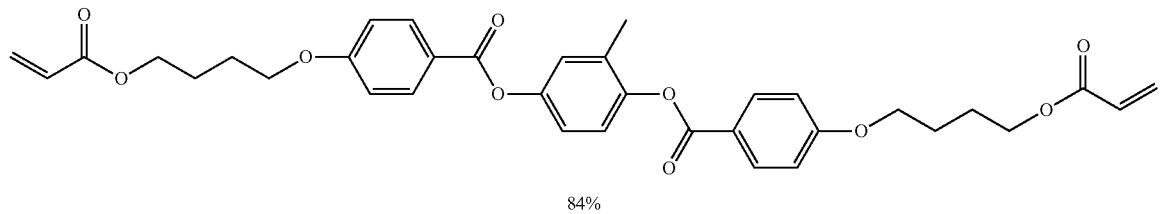

84%

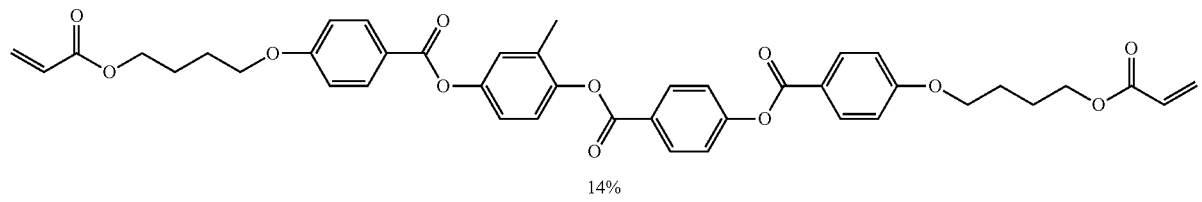

14%

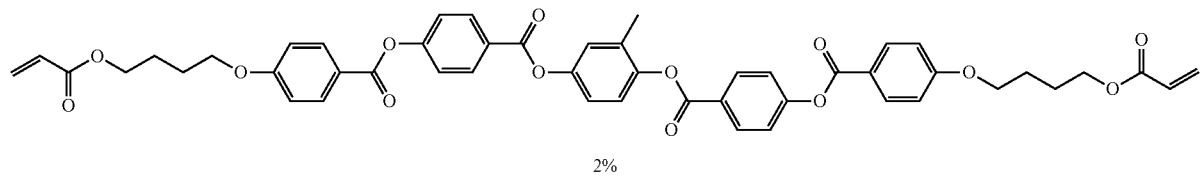

2%

The numerical value is expressed in units of mass %.

Alignment controlling agent 1

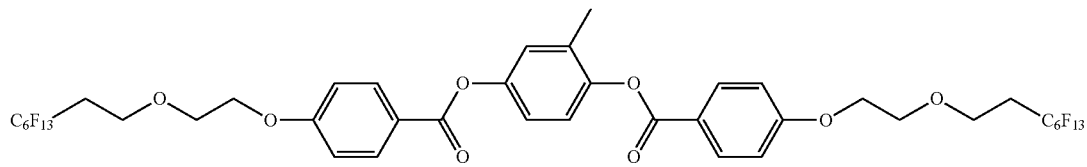

Alignment controlling agent 2

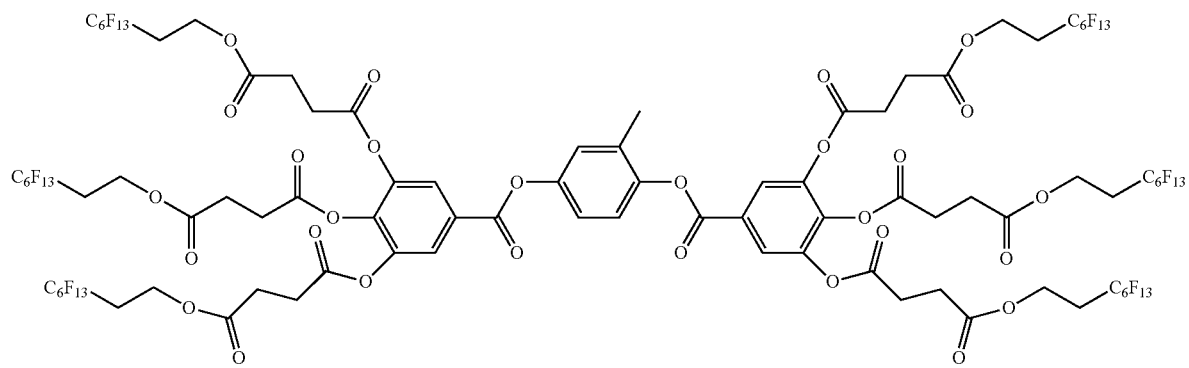

The cholesteric liquid crystal layer-forming coating liquid 1 and the cholesteric liquid crystal layer-forming coating liquid 2 were prepared by adjusting the content of the dextrorotatory chiral agent LC756 in the composition of the coating liquid. A single cholesteric liquid crystal layer having a thickness of 3 μm was formed on a temporary support in the same manner as the production of a half mirror described below using the cholesteric liquid crystal layer-forming coating liquid 1 or the cholesteric liquid crystal layer-forming coating liquid 2, and the reflection characteristics were checked. All the formed cholesteric liquid crystal layers were right circularly polarized light reflection layers. The reflection center wavelength was 580 nm for the coating liquid 1 and 700 nm for the coating liquid 2.

Retardation Layer-Forming Coating Liquid

The following components were mixed to prepare a retardation layer-forming coating liquid having the following composition.

Retardation Layer-Forming Coating Liquid
  Mixture 1: 100 parts by mass
  Fluorine-based horizontal alignment agent 1 (alignment controlling agent 1): 0.05 parts by mass
  Fluorine-based horizontal alignment agent 2 (alignment controlling agent 2): 0.01 parts by mass
  Polymerization initiator IRGACURE OXE01 (manufactured by BASF): 1.0 part by mass
  Solvent (methyl ethyl ketone): such an amount that the solute concentration was 20 mass %

Polarization Converting Layer-Forming Coating Liquid

The following components were mixed to prepare a polarization converting layer-forming coating liquid having the following composition.

Polarization Converting Layer-Forming Coating Liquid
  Mixture 1: 100 parts by mass
  Fluorine-based horizontal alignment agent 1 (alignment controlling agent 1 below): 0.05 parts by mass
  Fluorine-based horizontal alignment agent 2 (alignment controlling agent 2 below): 0.02 parts by mass
  Dextrorotatory chiral agent LC756 (manufactured by BASF): adjusted in accordance with the target reflection wavelength
  Polymerization initiator IRGACURE OXE01 (manufactured by BASF): 1.0 part by mass
  Solvent (methyl ethyl ketone): such an amount that the solute concentration was 20 mass %

A polarization converting layer-forming coating liquid was prepared by adjusting the content of the dextrorotatory chiral agent LC756 in the composition of the coating liquid so that the polarization converting layer had a reflection center wavelength $\lambda$. The film thickness d of the helical structure can be expressed by the relational expression, pitch (reflection center wavelength $\lambda$/in-plane average refractive index n)×number of pitches. Thus, $\lambda$ was determined by identifying the film thickness and the number of pitches. The number of pitches was determined from the twist angle (number of pitches×360°) measured by forming a single cholesteric liquid crystal layer having a desired film thickness on a temporary support and by fitting values measured with an AxoScan (manufactured by Axometrics).

Table 1 shows the combinations of the number of pitches, film thickness, and $\lambda$, which are target values of the prepared polarization converting layer-forming coating liquid.

TABLE 1

| | First polarization converting layer (inside car) | | | | Second polarization converting layer (outside car) | | | |
|---|---|---|---|---|---|---|---|---|
| | Type of polarization converting layer | Number of pitches | thickness Film | λ | Type of polarization converting layer | Number of pitches | thickness Film | λ |
| Example 1 | Cholesteric liquid crystal helical structure | 0.8 | 3.8 μm | 7400 nm | Cholesteric liquid crystal helical structure | 0.7 | 3.2 μm | 7100 nm |
| Example 2 | Cholesteric liquid crystal helical structure | 0.7 | 3.4 μm | 7550 nm | Cholesteric liquid crystal helical structure | 0.6 | 1.6 μm | 4150 nm |
| Example 3 | Cholesteric liquid crystal helical structure | 0.5 | 3 μm | 9350 nm | Cholesteric liquid crystal helical structure | 0.85 | 3.6 μm | 6950 nm |
| Example 4 | Cholesteric liquid crystal helical structure | 0.5 | 2 μm | 6200 nm | Cholesteric liquid crystal helical structure | 0.5 | 4.75 μm | 14900 nm |
| Comparative Example 1 | No adjustment because of λ/4 retardation layer | | | | Not disposed | | | |
| Comparative Example 2 | No adjustment because of λ/4 retardation layer | | | | Cholesteric liquid crystal helical structure | 0.89 | 2.7 μm | 6200 nm |
| Comparative Example 3 | Cholesteric liquid crystal helical structure | 0.7 | 1.2 μm | 2650 nm | Cholesteric liquid crystal helical structure | 0.85 | 3.6 μm | 6950 nm |
| Comparative Example 4 | Not disposed | | | | Not disposed | | | |

Saponification of Cellulose Acylate Film

A 40 μm cellulose acylate film formed by the production method in Example 20 of WO2014/112575A was caused to pass through dielectric heating rolls at 60° C. to increase the film surface temperature to 40° C. Then, an alkali solution having the following composition was applied onto one surface of the film in an amount of 14 mL/m² using a bar coater and retained for 10 seconds under a steam-type far infrared heater (manufactured by Noritake Co., Ltd.) heated to 110° C.

Then, pure water was applied in the same manner in an amount of 3 mL/m² using a bar coater.

Subsequently, washing with water using a fountain coater and draining using an air knife were repeatedly performed three times, and then the film was dried by being retained in a drying zone at 70° C. for 5 seconds to produce a saponified cellulose acylate film 1.

The cellulose acylate film 1 had an in-plane retardation of 1 nm as measured with an AxoScan.

Composition of Alkali Solution
  Potassium hydroxide: 4.7 parts by mass
  Water: 15.7 parts by mass
  Isopropanol: 64.8 parts by mass
  Surfactant ($C_{16}H_{33}O(CH_2CH_2O)_{10}H$): 1.0 part by mass
  Propylene glycol: 14.9 parts by mass Formation of Alignment Film An alignment film-forming coating liquid having the following composition was applied onto the saponified surface of the cellulose acylate film 1 (transparent support) in an amount of 24 mL/m² using a wire bar coater and dried with hot air at 100° C. for 120 seconds.

Composition of Alignment Film-Forming Coating Liquid
  Modified polyvinyl alcohol below: 28 parts by mass
  Citric acid ester (AS3, manufactured by Sankyo Kagaku Yakuhin Co., Ltd.): 1.2 parts by mass
  Photoinitiator (IRGACURE 2959, manufactured by BASF): 0.84 parts by mass
  Glutaraldehyde: 2.8 parts by mass
  Water: 699 parts by mass
  Methanol: 226 parts by mass

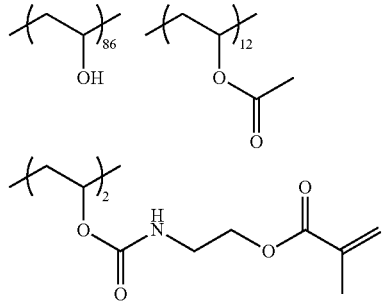

Figure 2:
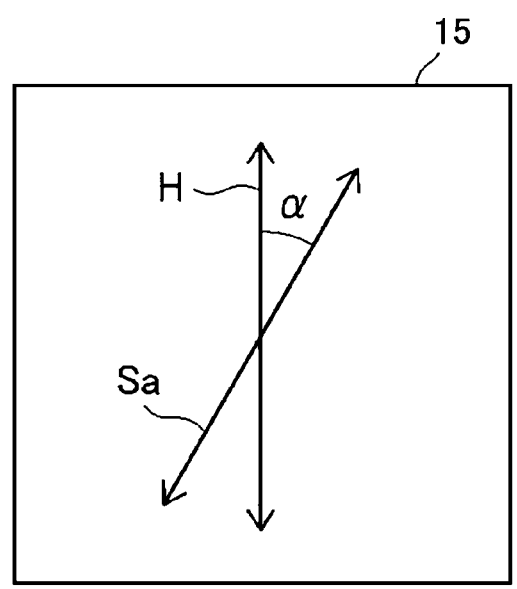
FIG. 2 is a schematic view for describing the relationship between a rubbing direction and a long-side direction of a support.

Production of Half Mirror (1) One surface of the cellulose acylate film 1 including the alignment film formed thereon and serving as a support was subjected to rubbing treatment (rayon cloth, pressure: 0.1 kgf (0.98 N), rotation speed: 1000 rpm (revolutions per minute), transport speed: 10 m/min, number of times: moved back and forth once) in a direction (a: rotation angle, H: long-side direction, Sa: rubbing direction in FIG. 2) rotated clockwise with respect to the longitudinal direction of the support viewed from the coating surface.

Table 2 shows the rotation angles during the rubbing treatment in Examples 1 to 4 and Comparative Examples 1 to 4.

In Examples 1 to 4 and Comparative Example 3, refer to the following.

(2) The first polarization converting layer-forming coating liquid was applied onto the rubbed surface of the alignment film on the cellulose acylate film 1 using a wire bar, dried, placed on a hot plate at 50° C., and then irradiated with UV light in an atmosphere with an oxygen concentration of 1000 ppm or less using an electrodeless lamp "D bulb" (60 mW/cm²) manufactured by Fusion UV Systems for 6 seconds to fix the liquid crystal phase. Thus, a first polarization converting layer was obtained. Herein, the number of pitches, film thickness, and λ of the first polarization converting layer were analyzed with an AxoScan (manufactured by Axometrics). They were the same as those in Table 1.

Among them, in Examples 1 to 3 and Comparative Example 3, refer to the following.

The cholesteric liquid crystal layer-forming coating liquid 1 was applied onto the surface of the obtained first polarization converting layer using a wire bar at room temperature to obtain a coating layer having a dry thickness of 0.65 µm. The amount of the solvent was adjusted so that the concentration of solid contents was 25 mass %. The coating layer was dried at room temperature for 30 seconds, heated in an atmosphere at 85° C. for 2 minutes, and then irradiated with UV (ultraviolet) light in an atmosphere with an oxygen concentration of 1000 ppm or less at 60° C. using a D bulb (lamp with 90 mW/cm) manufactured by Fusion at an output of 60% for 6 to 12 seconds to fix the cholesteric liquid crystal phase. Thus, a cholesteric liquid crystal layer having a thickness of 0.65 µm was obtained. This cholesteric liquid crystal layer corresponds to a first selectively reflecting layer.

Subsequently, the same process was further repeatedly performed on the surface of the obtained cholesteric liquid crystal layer using the cholesteric liquid crystal layer-forming coating liquid 2 to form a layer of the cholesteric liquid crystal layer-forming coating liquid 2 with a thickness of 0.71 µm. The layer of the cholesteric liquid crystal layer-forming coating liquid 1 corresponds to a first selectively reflecting layer, and the layer of the cholesteric liquid crystal layer-forming coating liquid 2 corresponds to a second selectively reflecting layer.

Thus, a half mirror with a support having a laminated body A including a functional layer that includes a first polarization converting layer and a selectively reflecting layer including two cholesteric liquid crystal layers was obtained. The reflection spectrum of the half mirror with a support obtained from the laminated body A was measured with a spectrophotometer (manufactured by JASCO Corporation, V-670). Consequently, a reflection spectrum having a selective reflection center wavelength at wavelengths of 580 nm and 700 nm was obtained.

Subsequently, a polarization converting layer 2 having a desired film thickness was further formed on the surface of the obtained cholesteric liquid crystal layer (second selectively reflecting layer) using the second polarization converting layer-forming coating liquid shown in Table 1.

In Example 4, a linearly polarized light reflection plate was used instead of the two cholesteric liquid crystal layers in Examples 1 to 3. The linearly polarized light reflection plate was produced by the method described in JP1997-506837A (JP-H09-506837A) by adjusting the thicknesses of 2,6-polyethylene naphthalate (PEN) and naphthalate 70/terephthalate 30 copolyester (coPEN) layers so as to have a selective reflection center wavelength of 670 nm. As in Examples 1 to 3, the first polarization converting layer and the second polarization converting layer were each formed on the rubbed surface of the alignment film on the cellulose acylate film. The first polarization converting layer, the linearly polarizing plate, and the second polarization converting layer were bonded to the corresponding adjacent layers in this order using a UV-curable adhesive Exp.U12034-6 manufactured by DIC Corporation.

In Comparative Examples 1 and 2, refer to the following. (2) The retardation layer-forming coating liquid was applied onto the rubbed surface of the alignment film on the cellulose acylate film 1 using a wire bar, dried, placed on a hot plate at 50° C., and then irradiated with UV light in an atmosphere with an oxygen concentration of 1000 ppm or less using an electrodeless lamp "D bulb" (60 mW/cm$^2$) manufactured by Fusion UV Systems for 6 seconds to fix the liquid crystal phase. Thus, a retardation layer having a desired front retardation, that is, a retardation layer whose thickness was adjusted to obtain a desired retardation was obtained. Herein, the retardation of the retardation layer measured with an AxoScan (manufactured by Axometrics) was 142 nm.

Two cholesteric liquid crystal layers were formed on the surface of the obtained retardation layer in the same manner as in Examples 1 to 3. In Comparative Example 2, a second polarization converting layer was further formed.

In Comparative Example 4, the production was performed in the same manner as in Example 4, except that the first polarization converting layer or the second polarization converting layer was not disposed.

As shown in Table 2, half mirrors with a support in Examples 1 to 4 and Comparative Examples 1 to 4 were produced.

Each of the obtained long half mirror was cut to a size of 280 mm in the longitudinal direction×250 mm in the width direction to obtain a sheet-shaped half mirror.

Production of Laminated Glass

Figure 5:
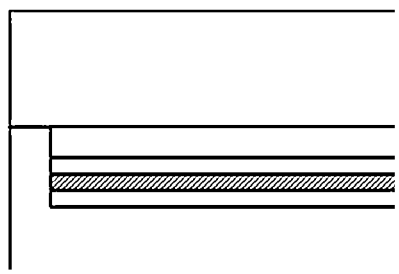
FIG. 5 illustrates a laminated glass in Example 1 viewed from the side.
Figure 6:
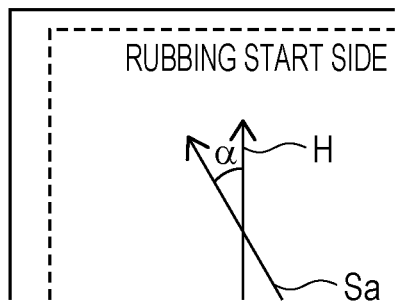
FIG. 6 illustrates the laminated glass in Example 1 viewed from the first polarization converting layer side.

A PVB film (intermediate film) manufactured by SEKISUI CHEMICAL Co., Ltd. and cut to a size of length 300 mm×width 300 mm with a thickness of 0.38 mm was placed on a glass plate (manufactured by Central Glass Co., Ltd., FL2, visible light transmittance: 90%) having a size of length 300 mm×width 300 mm with a thickness of 2 mm. Each of the sheet-shaped half mirrors was placed thereon so that the first polarization converting layer faced upward. A glass plate (manufactured by Central Glass Co., Ltd., FL2, visible light transmittance: 90%) having a size of length 300 mm×width 300 mm with a thickness of 2 mm was placed thereon. The resulting product was held at 90° C. and 10 kPa (0.1 atmospheres) for one hour and then heated in an autoclave (manufactured by KURIHARA SEISAKUSHO Co., Ltd.) at 115° C. and 1.3 MPa (13 atmospheres) for 20 minutes to remove air bubbles. Thus, a laminated glass was obtained. FIG. 5 illustrates the configuration of the laminated glass viewed from the side. FIG. 6 illustrates the relationship with the rubbing direction Sa viewed from the first polarization converting layer side. In FIG. 6, the upper side was a rubbing start side and the lower side was a rubbing end side.

Evaluation of Visible Light Transmittance

The visible light transmittance in an A light source defined in JIS R 3212:2015 (Test methods of safety glazing materials for road vehicles) was determined as a visible light transmittance. The visible light transmittance was evaluated on the basis of the following evaluation criteria. Table 3 shows the result of the visible light transmittance.

Evaluation Criteria of Visible Light Transmittance
  A: 83% or more
  B: 80% or more and less than 83%
  C: less than 80%

Evaluation of Brightness

Figure 7:
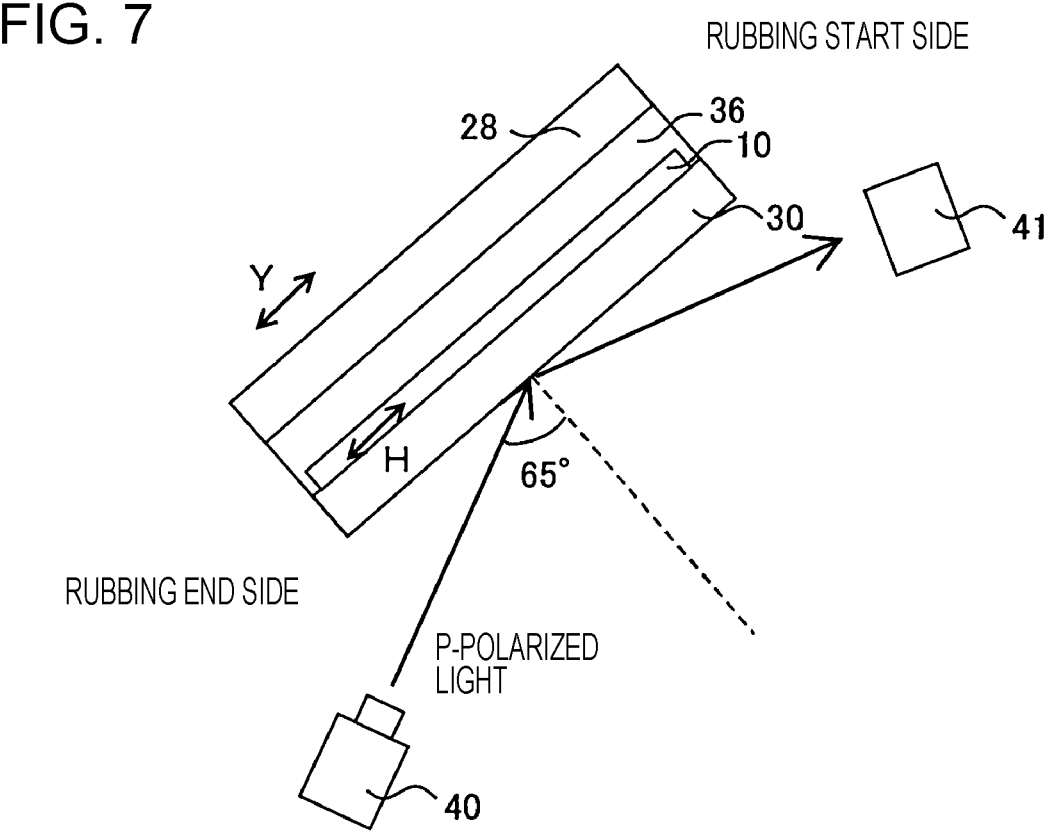
FIG. 7 illustrates a measurement system in the evaluation of brightness.

On a glass surface on the first polarization converting layer side, p-polarized light was incident at an angle of 65° with respect to the direction normal to the laminated glass. The reflectivity spectrum of the regularly reflected light (in a direction at an angle of 65° symmetrically with respect to the direction normal to the incidence plane) was measured with a spectrophotometer (manufactured by JASCO Corporation, V-670). At this time, the long-side direction of the half mirror and the transmission axis of p-polarized light of the spectrophotometer were set to be parallel. The axis H of the laminated glass matches the up and down direction Y, and the upper side of the glass is a rubbing start side (refer to FIG. 7). In conformity with JIS R 3106, a projection image reflectivity was calculated by multiplying the reflectivity by a coefficient based on luminosity and an emission spectrum of a typical liquid crystal display device at intervals of 10 nm in the wavelength range of 380 to 780 nm. The projection image reflectivity was evaluated as brightness. The brightness was evaluated on the basis of the following criteria. Table 3 shows the result of brightness.

Evaluation Criteria of Brightness
- A: 35% or more
- B: 25% or more and less than 35%
- C: less than 25%

Evaluation of Double Image

A black PET (absorbing material) was attached to a glass surface of the laminated glass on the second polarization converting layer side. As in the evaluation of brightness, p-polarized light was incident at an angle of 65° with respect to the direction normal to the glass surface on the first polarization converting layer 1 side. The reflectivity spectrum of the regularly reflected light was measured with a spectrophotometer (manufactured by JASCO Corporation, V-670).

The double image was evaluated as (brightness—brightness at which the black PET was attached)/brightness, which is a ratio of reflection on the back surface of the laminated glass and brightness. Table 3 shows the result of double image.

Evaluation Criteria of Double Image
- A: less than 4%
- B: 4% or more and less than 7%
- C: 7% or more Evaluation of Suitability for Polarizing Sunglasses On a glass surface of the laminated glass on the second polarization converting layer side, s-polarized light was incident at an angle of 65° with respect to the direction normal to the laminated glass. The transmittance spectrum of the transmitted p-polarized light was measured with a spectrophotometer (manufactured by JASCO Corporation, V-670) from the side opposite to the incidence plane of the laminated glass.

Figure 8:
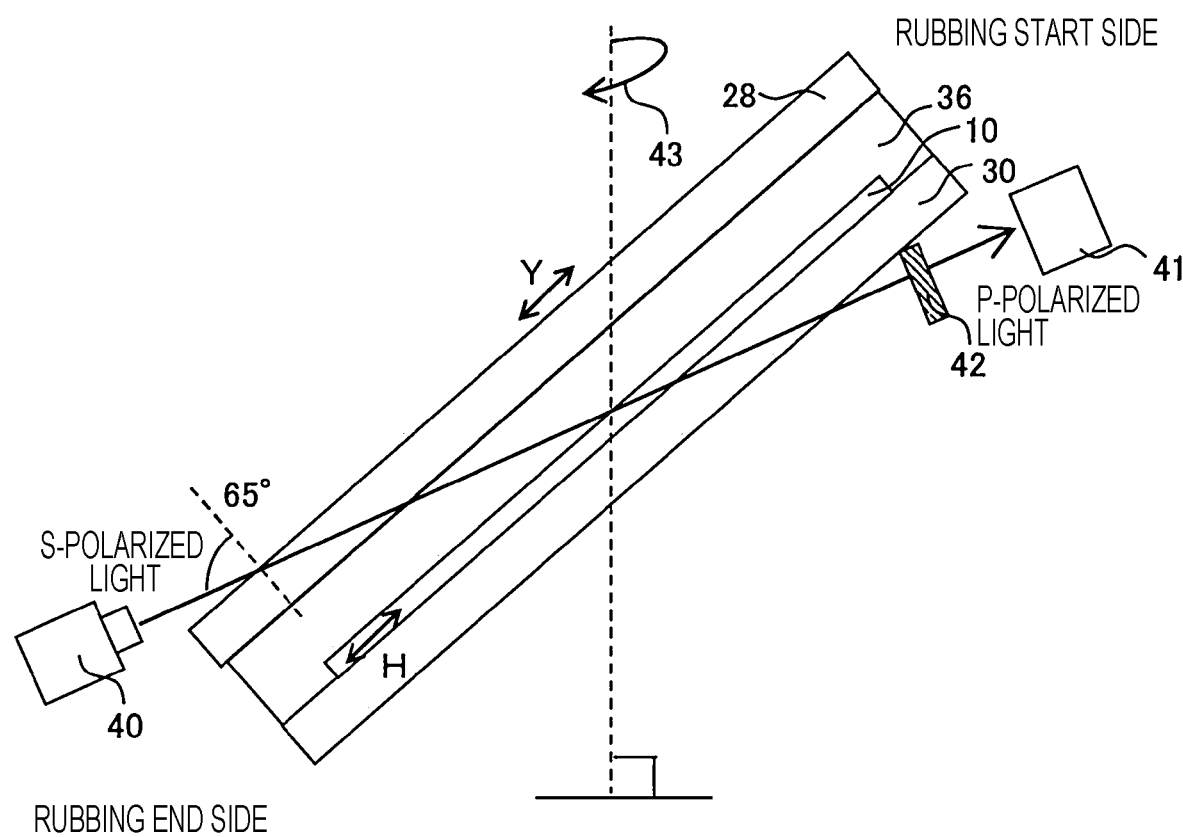
FIG. 8 illustrates a measurement system in the evaluation of suitability for polarizing sunglasses.

At this time, by disposing a linearly polarizing plate in a light receiving section of the spectrophotometer, the long-side direction of the half mirror and the transmission axis of incident p-polarized light of the spectrophotometer were set to be parallel (refer to FIG. 8). In conformity with JIS R 3106, a visible light transmittance was calculated by multiplying a coefficient based on luminosity and an emission spectrum of a D65 light source at intervals of 10 nm in the wavelength range of 380 to 780 nm. The visible light transmittance was evaluated as suitability for polarizing sunglasses. The suitability for polarizing sunglasses was evaluated on the basis of the following criteria. Table 3 shows the result of brightness.

Evaluation Criteria of Suitability for Polarizing Sunglasses
- A: less than 3%
- B: 3% or more and less than 5%
- C: 5% or more Evaluation of Suitability for Polarizing Sunglasses on Light Obliquely Incident from Outside The evaluation was performed in the same manner as in the evaluation of suitability for polarizing sunglasses while the laminated glass was rotated 20° or 40° with respect to the axis 43 in FIG. 8. The suitability for polarizing sunglasses was evaluated on the basis of the following criteria. Table 3 shows the result of brightness.

Evaluation Criteria of Suitability for Polarizing Sunglasses
- A: less than 3%
- B: 3% or more and less than 5%
- C: 5% or more

TABLE 2

| | First polarization converting layer (inside car) | | Second polarization converting layer (outside car) | | | Selectively reflecting layer | | | | |
|---|---|---|---|---|---|---|---|---|---|---|
| | | | | | | | G reflection | | R reflection | |
| | Rubbing angle | Formula (i) | Formula (ii) | Formula (iii) | Formula (iv) | Formula (v) | Type of reflection layer | peak wavelength | G reflectivity | peak wavelength | R reflectivity |
| Example 1 | 0 | O | O | O | O | O | Circularly polarized light reflection layer | 580 nm | 15% | 700 nm | 25% |
| Example 2 | 90 | O | O | O | O | O | Circularly polarized light reflection layer | 580 nm | 15% | 700 nm | 25% |
| Example 3 | 45 | O | O | O | O | O | Circularly polarized light reflection layer | 580 nm | 15% | 700 nm | 25% |
| Example 4 | 0 | O | O | O | O | O | Linearly polarized light reflection layer | — | — | 670 nm | 32% |
| Comparative Example 1 | 45 | x | x | x | x | x | Circularly polarized light reflection layer | 580 nm | 15% | 700 nm | 25% |
| Comparative Example 2 | 45 | x | x | O | O | O | Circularly polarized light reflection layer | 580 nm | 15% | 700 nm | 25% |
| Comparative Example 3 | 45 | O | x | O | O | O | Circularly polarized light reflection layer | 580 nm | 15% | 700 nm | 25% |
| Comparative Example 4 | 0 | x | x | x | x | x | Linearly polarized light reflection layer | — | — | 670 nm | 32% |

O: Each formula is satisfied.

x: Each formula is not satisfied.

TABLE 3

|  | Evaluation | | | | | |
| --- | --- | --- | --- | --- | --- | --- |
|  | Visible light transmittance | Brightness | Double image | Suitability for polarizing sunglasses 0° | Suitability for polarizing sunglasses 20° | Suitability for polarizing sunglasses 40° |
| Example 1 | A | A | A | A | A | A |
| Example 2 | A | A | A | A | A | A |
| Example 3 | A | A | A | A | A | B |
| Example 4 | A | B | A | A | A | A |
| Comparative Example 1 | A | A | C | C | C | C |
| Comparative Example 2 | A | A | A | A | C | C |
| Comparative Example 3 | A | C | B | C | C | C |
| Comparative Example 4 | A | A | A | A | C | C |

Tables 2 and 3 show that the results in Examples 1 to 4 were better in terms of brightness, double image, and suitability for polarizing sunglasses on obliquely incident light than those in Comparative Examples 1 to 4. Thus, visible light transmittance, brightness, double image, and suitability for polarizing sunglasses were provided in a good balance.

In Comparative Examples 1, 2, and 4, two polarization converting layers were not provided, which resulted in poor suitability for polarizing sunglasses on obliquely incident light.

In Comparative Example 3, the film thickness and the number of pitches of the polarization converting layer were not appropriate, which resulted in poor double image and suitability for polarizing sunglasses.

REFERENCE SIGNS LIST

- 10 projection image-displaying member
- 11 second polarization converting layer
- 12 selectively reflecting layer
- 12G first selectively reflecting layer
- 12R second selectively reflecting layer
- 14 first polarization converting layer
- 15 support
- 20 head-up display system (HUD)
- 22 projector
- 24 windshield glass
- 25, 30a surface
- 28 first glass plate
- 30 second glass plate
- 36 intermediate film
- 38 adhesive layer
- 40 light source of spectrophotometer
- 41 detector of spectrophotometer
- 42 linearly polarizing plate
- 43 rotation direction during measurement
- D driver
- H axis
- Sa slow axis
- Y up and down direction

What is claimed is:

1. A projection image-displaying member comprising, in this order:
   a first polarization converting layer;
   at least one selectively reflecting layer; and
   a second polarization converting layer,
   wherein the first polarization converting layer and the second polarization converting layer are layers formed by fixing a helical alignment structure of a liquid crystal compound,
   a number of pitches in the helical alignment structure and a film thickness satisfy all relational expressions below,
   when the first polarization converting layer has a number of pitches $x_1$ and a film thickness $y_1$ (unit: μm), $$0.3 \leq x_1 \leq 2.0 \text{ and} \tag{i}$$

$$y_1 \geq 1.86 x_1 + 0.13, \text{ and} \tag{ii}$$

when the second polarization converting layer has a number of pitches $x_2$ and a film thickness $y_2$ (unit: μm), $$0.25 \leq x_2 \leq 2.0, \tag{iii}$$

$$y_2 \leq 1.37 x_2 + 5.5, \text{ and} \tag{iv}$$

$$y_2 \geq 1.37 x_2 + 0.25. \tag{v}$$

2. The projection image-displaying member according to claim 1, wherein the selectively reflecting layer is a linearly polarized light reflection layer.

3. The projection image-displaying member according to claim 1, wherein the selectively reflecting layer is a circularly polarized light reflection layer.

4. A windshield glass comprising:
   the projection image-displaying member according to claim 1 between a first glass plate and a second glass plate.

5. A head-up display system comprising:
   the windshield glass according to claim 4; and
   a projector that emits p-polarized projection image light from a side of the first polarization converting layer of the windshield glass.

6. A windshield glass comprising:
   the projection image-displaying member according to claim 2 between a first glass plate and a second glass plate.

7. A head-up display system comprising:
   the windshield glass according to claim 6; and
   a projector that emits p-polarized projection image light from a side of the first polarization converting layer of the windshield glass.

8. A windshield glass comprising:
   the projection image-displaying member according to claim 3 between a first glass plate and a second glass plate.

9. A head-up display system comprising:
the windshield glass according to claim 8; and
a projector that emits p-polarized projection image light from a side of the first polarization converting layer of the windshield glass.

\* \* \* \* \*